United States Patent
Katoh et al.

(10) Patent No.: US 10,647,802 B2
(45) Date of Patent: May 12, 2020

(54) POLYMER COMPOUND

(71) Applicant: FUJIFILM Corporation, Tokyo (JP)

(72) Inventors: Shunya Katoh, Kanagawa (JP);
Masaru Yoshikawa, Kanagawa (JP);
Masaaki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/366,343

(22) Filed: Mar. 27, 2019

(65) Prior Publication Data

US 2019/0218324 A1 Jul. 18, 2019

Related U.S. Application Data

(63) Continuation of application No. PCT/JP2017/034469, filed on Sep. 25, 2017.

(30) Foreign Application Priority Data

Sep. 30, 2016 (JP) ................................. 2016-194371

(51) Int. Cl.

| C08F 220/28 | (2006.01) |
| --- | --- |
| C08F 230/06 | (2006.01) |
| C08F 220/34 | (2006.01) |
| C08F 220/58 | (2006.01) |
| C08F 220/56 | (2006.01) |
| C08F 220/30 | (2006.01) |
| C08F 212/14 | (2006.01) |
| C08F 12/34 | (2006.01) |
| C08F 12/22 | (2006.01) |
| C08F 222/22 | (2006.01) |
| C08F 212/12 | (2006.01) |
| G02B 5/30 | (2006.01) |
| C08F 222/10 | (2006.01) |

(52) U.S. Cl.
CPC ............ C08F 220/28 (2013.01); C08F 12/22 (2013.01); C08F 12/34 (2013.01); C08F 212/12 (2013.01); C08F 212/14 (2013.01); C08F 220/30 (2013.01); C08F 220/34 (2013.01); C08F 220/56 (2013.01); C08F 220/58 (2013.01); C08F 230/06 (2013.01); G02B 5/30 (2013.01); C08F 220/281 (2020.02); C08F 220/283 (2020.02); C08F 220/343 (2020.02); C08F 220/346 (2020.02); C08F 222/102 (2020.02); C08F 222/103 (2020.02); C08F 222/225 (2020.02)

(58) Field of Classification Search
CPC .................................................... C08F 230/06
See application file for complete search history.

(56) References Cited

U.S. PATENT DOCUMENTS

| 9,580,532 B1* | 2/2017 | Flook ..................... C08F 236/06 |
| 10,241,251 B2* | 3/2019 | Ishiguro ................ C08F 222/10 |
| 2008/0099172 A1* | 5/2008 | Pelton ................... C08F 226/02 |
| | | 162/164.6 |
| 2009/0285989 A1* | 11/2009 | Lozman ................... B01J 13/14 |
| | | 427/256 |
| 2012/0283403 A1* | 11/2012 | Matsumoto ............. C07F 5/025 |
| | | 526/239 |
| 2013/0261274 A1* | 10/2013 | Carlson ................. C08F 224/00 |
| | | 526/239 |
| 2016/0068756 A1* | 3/2016 | Moriya ............... C09K 19/3494 |
| | | 428/1.31 |
| 2016/0209565 A1* | 7/2016 | Nakao ..................... G02B 5/305 |
| 2016/0223719 A1 | 8/2016 | Ishiguro |
| 2016/0280827 A1* | 9/2016 | Anderson ............. C08F 230/06 |
| 2016/0327711 A1* | 11/2016 | Ishiguro ................ C08F 222/10 |
| 2017/0306197 A1 | 10/2017 | Shimokawa et al. |
| 2019/0031920 A1 | 1/2019 | Saito et al. |
| 2019/0092899 A1* | 3/2019 | Tamura ................... C08L 45/00 |
| 2019/0106599 A1 | 4/2019 | Okamoto et al. |
| 2019/0136036 A1* | 5/2019 | Otani ..................... C08L 33/16 |

FOREIGN PATENT DOCUMENTS

| JP | 55-66910 A | 5/1980 |
| JP | H07126323 A | 5/1995 |

(Continued)

OTHER PUBLICATIONS

International Search Report Issued in PCT/JP2017/034469 dated Nov. 21, 2017.

(Continued)

Primary Examiner — Nicole M. Buie-Hatcher
(74) Attorney, Agent, or Firm — Edwards Neils LLC; Jean C. Edwards, Esq.

(57) ABSTRACT

An object of the present invention is to provide a polymer compound capable of improving adhesiveness between a hydrophobic member and a hydrophilic member. The polymer compound of the present invention is a polymer compound having a repeating unit represented by Formula (I) and a repeating unit represented by Formula (II).

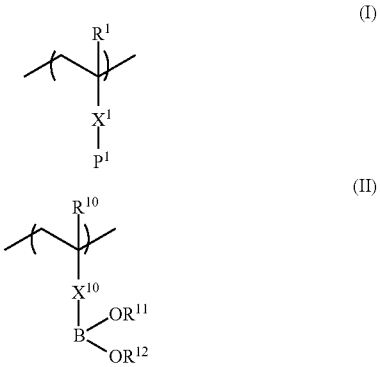

14 Claims, No Drawings

(56) References Cited

FOREIGN PATENT DOCUMENTS

| | | | |
|---|---|---|---|
| JP | 07-304971 A | | 11/1995 |
| JP | 08119822 A | * | 5/1996 |
| JP | 2008225281 A | | 9/2008 |
| JP | 2010511863 A | | 4/2010 |
| JP | 2016051178 A | | 4/2016 |
| JP | 2016066041 A | | 4/2016 |
| JP | 2017-160313 A | | 9/2017 |
| JP | 2017-193634 A | | 10/2017 |
| JP | 2017-194633 A | | 10/2017 |
| WO | 2008066921 A2 | | 6/2008 |
| WO | WO-2013153960 A1 | * | 10/2013 |
| WO | 2014199934 A1 | | 12/2014 |
| WO | WO-2015053359 A1 | * | 4/2015 |
| WO | 2015053359 A1 | | 3/2017 |

OTHER PUBLICATIONS

Written Opinion Issued in PCT/JP2017/034469 dated Nov. 21, 2017.
International Preliminary Report on Patentability Issued in PCT/JP2017/034469 dated Apr. 2, 2019.
Office Action, issued by the Japanese Patent Office dated Dec. 10, 2019, in connection with Japanese Patent Application No. 2018-542538.
Office Action, issued by the Japanese Patent Office dated Mar. 3, 2020, in connection with Japanese Patent Application No. 2018-542538.

* cited by examiner

POLYMER COMPOUND

CROSS-REFERENCE TO RELATED APPLICATIONS

This application is a Continuation of PCT International Application No. PCT/JP2017/034469 filed on Sep. 25, 2017, which was published under PCT Article 21(2) in Japanese, and which claims priority under 35 U.S.C. § 119(a) to Japanese Patent Application No. 2016-194371 filed on Sep. 30, 2016. The above applications are hereby expressly incorporated by reference, in their entirety, into the present application.

BACKGROUND OF THE INVENTION

1. Field of the Invention

The present invention relates to a polymer compound, and particularly relates to a polymer compound capable of imparting adhesiveness to a hydrophilic member.

2. Description of the Related Art

As a laminated structure having a hydrophilic member and a hydrophobic member, for example, in an image display device such as a liquid crystal display (LCD), an organic light emitting diode (OLED), or the like, it is known to use a laminated structure (so-called polarizing plate) in which an optical film is laminated on one surface or both surfaces of a polarizer in which a dichroic dye such as an iodine complex is adsorbed and aligned in a polyvinyl alcohol (PVA)-based resin.

As an optical film used in a polarizing plate, an optical film having an optically anisotropic layer (phase difference layer) in which a liquid crystal compound is aligned on a support of triacetyl cellulose (TAC) or the like and the alignment state thereof is immobilized is known.

In addition, a polarizing plate in which such an optical film is used generally has a configuration in which a polarizer and a support of the optical film are laminated using a polyvinyl alcohol-based adhesive or the like.

In recent years, from the viewpoint of widening the viewing angle and thinning of a polarizing plate and the like, a configuration in which a polarizer and an optically anisotropic layer of an optical film are laminated and a configuration in which a polarizer and an optically anisotropic layer of an optical film are laminated and then a support is peeled off have been proposed (for example, refer to WO2014/199934A).

SUMMARY OF THE INVENTION

The present inventors have conducted investigations on the lamination of the polarizer and the optically anisotropic layer of the optical film described in WO2014/199934A, and have found that there is room for improvement adhesiveness between the optically anisotropic layer as a hydrophobic member and the polarizer as a hydrophilic member.

An object of the present invention is to provide a polymer compound capable of improving adhesiveness between a hydrophobic member and a hydrophilic member.

As a result of conducting intensive investigations to achieve the above object, the present inventors have found that by using a polymer compound having two or more kinds of predetermined repeating units as a material for forming a hydrophobic member, adhesiveness between a hydrophobic member to be formed and a hydrophilic member is improved and thus have completed the present invention.

That is, it has been found that the above object can be achieved by the following constitutions.

[1] A polymer compound comprising: a repeating unit represented by Formula (I); and a repenting unit represented by Formula (II),

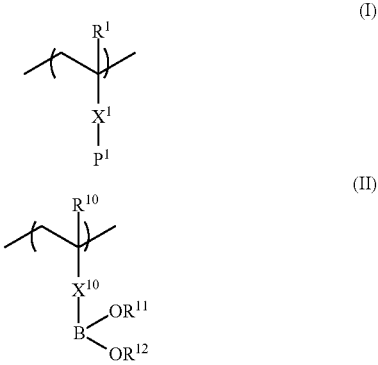

in Formula (I), $R^1$ represents a hydrogen atom or an alkyl group having 1 to 20 carbon atoms; $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —X$^1$—P$^1$; and $P^1$ represents a polymerizable group, and in Formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other through an alkylene linking group, an arylene linking group, or a linking group of a combination thereof; $X^{10}$ represents a single bond or a divalent linking group selected from the group consisting of —O—, —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms.

[2] The polymer compound according to [1], in which the polymerizable group represented by $P^1$ in Formula (I) is any polymerizable group selected from the group consisting of groups represented by Formulae (P-1) to (P-7),

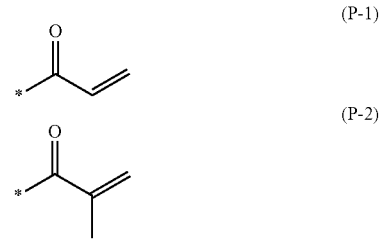

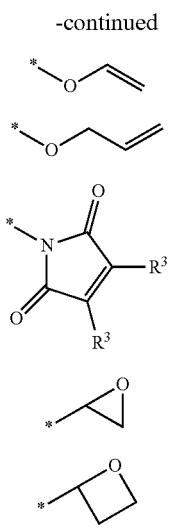

(P-3)

(P-4)

(P-5)

(P-6)

(P-7)

in Formulae (P-1) to (P-7), * represents a bonding position with $X^1$; $R^3$ represents a hydrogen atom or an alkyl group having 1 to 5 carbon atoms; and two $R^3$'s may be the same or different from each other and may be linked to each other to form a ring structure.

[3] The polymer compound according to [1], in which the polymerizable group represented by $P^1$ in Formula (I) is any polymerizable group selected from the group consisting of groups represented by Formulae (P-1) to (P-3), (P-1)

(P-2)

(P-3)

in Formulae (P-1) to (P-3), * represents a bonding position with $X^1$.

[4] The polymer compound according to any one of [1] to [3], in which $R^1$ in Formula (I) is a hydrogen atom or a methyl group, and $X^1$ in Formula (I) is a divalent linking group selected from the group consisting of —O—, —COO—, —OCO—, a substituted or unsubstituted divalent aliphatic group, and a combination thereof.

[5] The polymer compound according to any one of [1] to [4], further comprising: a repeating unit represented by Formula (III),

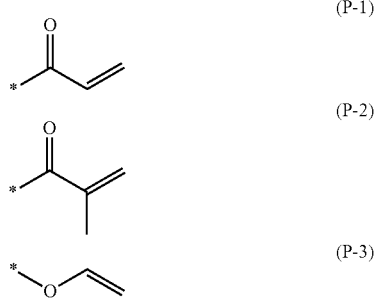

(III)

in Formula (III), $R^{20}$ represents a hydrogen atom or an alkyl group having 1 to 20 carbon atoms; $R^{21}$ represents an alkyl group having 4 to 20 carbon atoms, an alkyl group having 1 to 20 carbon atoms in which at least one hydrogen atom is substituted with a fluorine atom, or a monovalent organic group including —Si($R^{a3}$)($R^{a4}$)O—; $R^{a3}$ and $R^{a4}$ each independently represent an alkyl group, a haloalkyl group, or an aryl group; and $L^{20}$ represents a divalent linking group selected from the group consisting of —O—, —COO—, —OCO—, a divalent aliphatic group, and a combination thereof.

[6] The polymer compound according to [5], in which $R^{21}$ in Formula (III) is an alkyl group having 1 to 20 carbon atoms in which at least one hydrogen atom is substituted with a fluorine atom.

[7] The polymer compound according to [6], in which the repeating unit represented by Formula (III) is a repeating unit represented by Formula (IV),

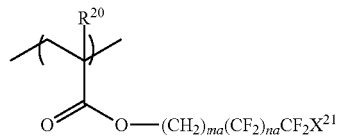

(IV)

in Formula (IV), $R^{20}$ represents a hydrogen atom or an alkyl group having 1 to 20 carbon atoms; ma and na each independently represent an integer of 0 to 19; where ma and na represent an integer of 0 to 19 in total; and $X^{21}$ represents a hydrogen atom or a fluorine atom.

[8] The polymer compound according to any one of [5] to [7], in which a content of the repeating unit represented by Formula (I) is 10% to 50% by mass with respect to all repeating units, a content of the repeating unit represented by Formula (II) is 5% to 50% by mass with respect to all repeating units, and a content of the repeating unit represented by Formula (III) is 10% to 60% by mass with respect to all repeating units.

According to the present invention, it is possible to provide a polymer compound capable of improving adhesiveness between a hydrophobic member and a hydrophilic member.

DESCRIPTION OF THE PREFERRED EMBODIMENTS

Hereinafter, the present invention will be described in detail.

Descriptions of the constitutional elements described below are sometimes made based on representative embodiments of the present invention, but the present invention is not limited to such embodiments.

The numerical range which is shown by "to" used in the present specification means the range including the numerical values described before and after "to" as the lower limit and the upper limit, respectively.

In addition, the expression "(meth)acrylate" is used to refer to "one or both of acrylate and methacrylate". The same applies to (meth)acrylic acid, (meth)acrylamide, (meth)acryloyl group, and the like.

Polymer Compound

A polymer compound according to an embodiment of the present invention is a copolymer having a repeating unit represented by Formula (I) described later and a repeating unit represented by Formula (II) described later.

In the present invention, as described above, by using the polymer compound having the repeating unit represented by Formula (I) described later and the repeating unit represented by Formula (II) described later, adhesiveness between a hydrophobic member to be formed and a hydrophilic member is improved.

Although the details thereof are not clear, the present inventors assume as follows.

That is, it is considered that due to the fact that the repeating unit represented by Formula (I) included in the copolymer contributes to the crosslinking reaction with a matrix component of a hydrophobic member (for example, a liquid crystal compound having a polymerizable group or the like) and the repeating unit represented by Formula (II) included in the copolymer contributes to the affinity with the surface of a hydrophilic member (for example, a polarizer or the like), the adhesiveness is improved.

Hereinafter, each component of the polymer compound according to the embodiment of the present invention will be described in detail.

The polymer compound according to the embodiment of the present invention is a copolymer having a repeating unit represented by Formula (I) (hereinafter, abbreviated as a "I part") and a repeating unit represented by Formula (II) (hereinafter, abbreviated as "II part").

In addition, it is preferable that the polymer compound of the present invention has a repeating unit represented by Formula (III) (hereinafter, abbreviated as "III part").

Further, it is preferable that the polymer compound of the present invention has a repeating unit represented by Formula (V) (hereinafter, abbreviated as "V part").

The polymer compound according to the embodiment of the present invention is intended for a copolymer which has completed the polymerization reaction for forming the main chain skeleton, and is a copolymer capable of forming crosslinking with molecules or other compounds (for example, a liquid crystal compound, and the like) by the polymerizable group contained in the side chain of the repeating unit represented by Formula (I). Therefore, the polymer compound according to the embodiment of the present invention can be dissolved in a solvent and used for coating application.

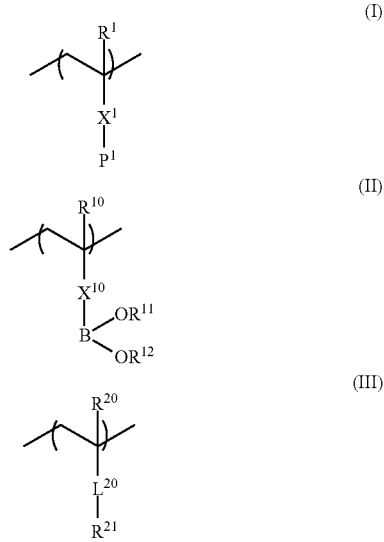

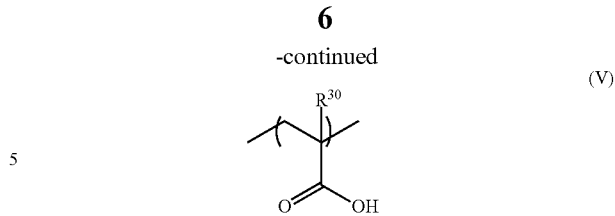

<I Part>

The I part of the polymer compound of the present invention is a repeating unit represented by Formula (I).

In Formula (I), $R^1$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, and a hydrogen atom or a methyl group is even more preferable.

In addition, in Formula (I), $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; and $R^2$ represents a hydrogen atom, an alkyl group having 1 to 20 carbon atoms, or —X$^1$—P$^1$. In a case where $R^2$ is —X$^1$—P$^1$, $P^1$ represents a polymerizable group as $P^1$ in Formula (I).

Here, examples of the substituted or unsubstituted divalent aliphatic group represented by $X^1$ include an alkylene group having 1 to 20 carbon atoms which may have a substituent, or a cycloalkylene group having 3 to 20 carbon atoms which may have a substituent (for example, cyclohexylene group). Of these, an alkylene group having 1 to 15 carbon atoms is preferable, an alkylene group having 1 to 8 carbon atoms is more preferable, and a methylene group, an ethylene group, a propylene group, and a butylene group are even more preferable.

In addition, examples of the substituted or unsubstituted divalent aromatic group represented by $X^1$ include a divalent aromatic hydrocarbon group which may have a substituent or a divalent aromatic heterocyclic group which may have a substituent. Examples of the divalent aromatic hydrocarbon group include groups obtained by respectively removing one hydrogen atom from two carbon atoms constituting a ring structure of an aromatic hydrocarbon ring such as a benzene ring, a naphthalene ring, an anthracene ring, a triphenylene ring, and a fluorene ring. Of these, a phenylene group or a naphthylene group obtained by respectively removing one hydrogen atom from two carbon atoms constituting the ring structure of a benzene ring or a naphthalene ring is preferable. On the other hand, examples of the divalent aromatic heterocyclic group include groups obtained by respectively removing one hydrogen atom from two carbon atoms constituting a ring structure of an aromatic heterocyclic ring of a furan ring, a pyrrole ring, a thiophene ring, a pyridine ring, a thiazole ring, a benzothiazole ring, an oxadiazole ring, a thiazolothiazole ring, and a phenanthroline ring.

Examples of the substituent which the divalent aliphatic group or the divalent aromatic group may have include a halogen atom, a hydroxyl group, an amino group, an acryloyloxy group, a methacryloyloxy group, an alkyl group having 1 to 20 carbon atoms, a carboxyl group, a cyano group, —$X^1$—$P^1$, and groups obtained by combining one or more of —O—, —S—, —COO—, —OCO—, —CONR$^2$—, —NR$^2$COO—, —HC=CH—, and —CR$^2$N— with these groups. $R^2$ represents a hydrogen atom, an alkyl group having 1 to 20 carbon atoms, or —$X^1$—$P^1$. In a case where $R^2$ is —$X^1$—$P^1$, $P^1$ represents a polymerizable group as $P^1$ in Formula (I).

The alkyl group having 1 to 20 carbon atoms represented by $R^2$ is preferably an alkyl group having 1 to 6 carbon atoms, and specific examples thereof include a methyl group, an ethyl group, a propyl group, an isopropyl group, an n-butyl group, an isobutyl group, a sec-butyl group, a tert-butyl group, an n-pentyl group, and an n-hexyl group.

In addition, in Formula (I), $P^1$ represents a polymerizable group.

In the present invention, the polymerizable group represented by $P^1$ in Formula (I) is preferably any polymerizable group selected from the group consisting of groups represented by Formulae (P-1) to (P-7). Among these, any polymerizable group selected from the group consisting of groups represented by Formulae (P-1) to (P-3) is more preferable, and a polymerizable group represented by Formula (P-1) or (P-2) is even more preferable.

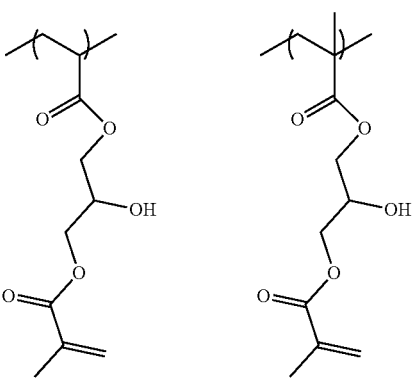

(P-1)

(P-2)

(P-3)

(P-4)

(P-5)

(P-6)

(P-7)

In Formulae (P-1) to (P-7), * represents a bonding position with $X^1$. $R^3$ represents a hydrogen atom or an alkyl group having 1 to 5 carbon atoms, and two $R^3$'s may be the same or different from each other and may be linked to each other to form a ring structure.

In addition, specific examples of the alkyl group having 1 to 5 carbon atoms represented by $R^3$ include a methyl group, an ethyl group, a propyl group, an isopropyl group, and an n-butyl group.

In the present invention, from the viewpoint of ease of production, economic efficiency, and radical polymerizability, as the repeating unit represented by Formula (I), a repeating unit in which $R^1$ in Formula (I) is a hydrogen atom or a methyl group, and $X^1$ in Formula (I) is a divalent linking group selected from the group consisting of —O—, —COO—, —OCO—, a substituted or unsubstituted divalent aliphatic group (preferably, an alkylene group having 2 to 8 carbon atoms), and a combination thereof is preferable.

Specific examples of the repeating unit represented by Formula (I) include repeating units represented by the following formulae.

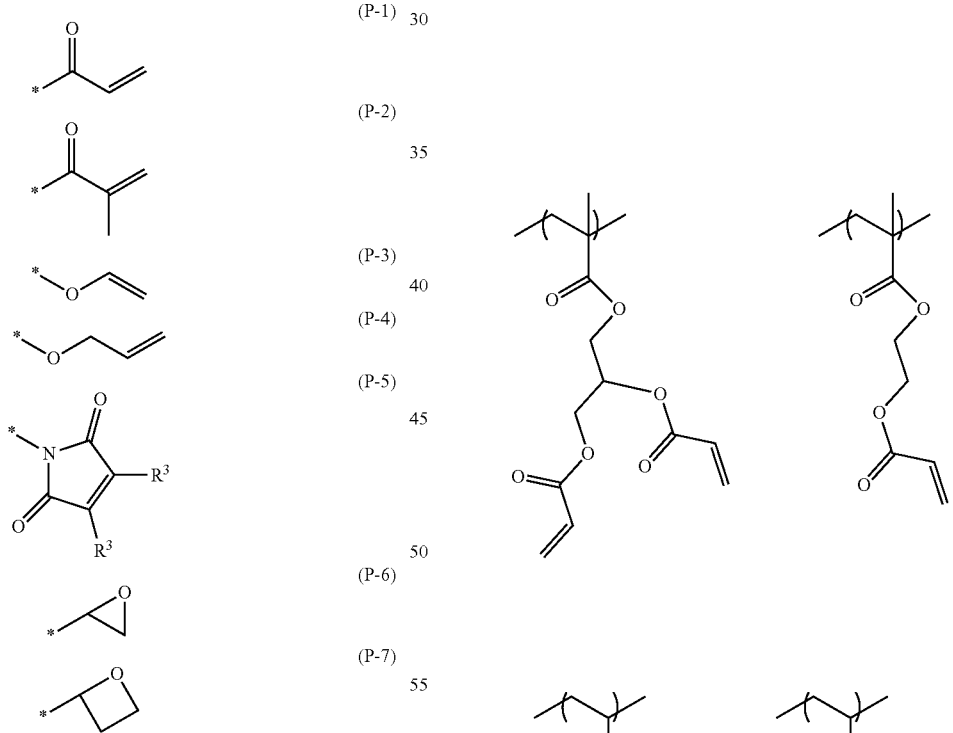

-continued

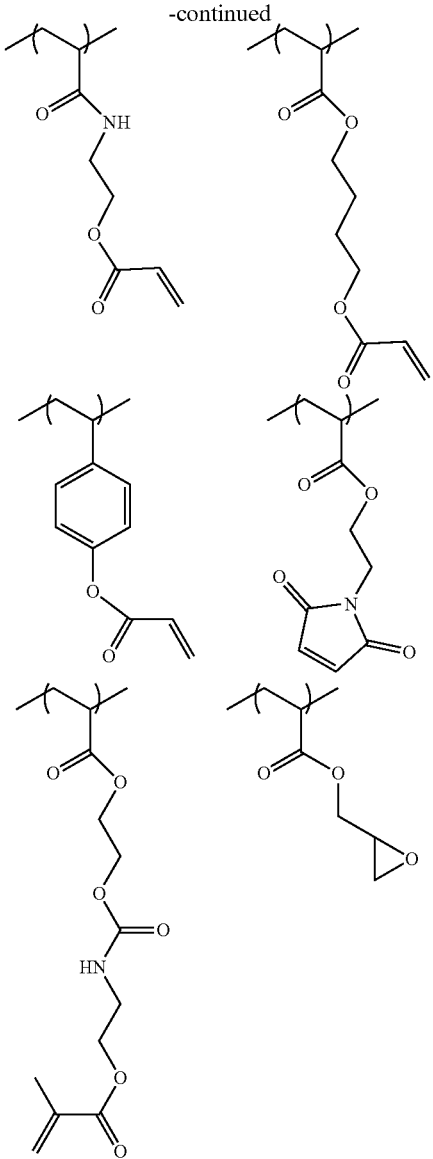

In the present invention, the content of the repeating unit represented by Formula (I) is preferably 5% to 80% by mass, more preferably 7% to 70% y mass, and even more preferably 10% to 50% by mass with respect to all repeating units.

<II Part>

The II part of the polymer compound of the present invention is a repeating unit represented by Formula (II).

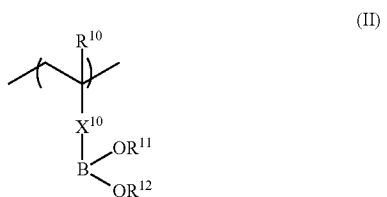

(II)

In Formula (II), $R^{10}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, and a hydrogen atom or a methyl group is even more preferable.

In addition, in Formula (II), $X^{10}$ represents a single bond or a divalent linking group selected from the group consisting of —O—, —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms.

Here, examples of the divalent aliphatic group and the divalent aromatic group represented by $X^{10}$ include the same groups as those described for $X^1$ in Formula (I), and examples of the alkyl group having 1 to 20 carbon atoms represented by $R^{13}$ include the same groups as those described for $R^2$ in connection with Formula (I).

In addition, in Formula (II), $R^{11}$ and $R^{12}$ each independently represent a hydrogen atom or a substituted or unsubstituted aliphatic hydrocarbon group, a substituted or unsubstituted aryl group, or a substituted or unsubstituted heteroaryl group, and $R^{11}$ and $R^{12}$ may be linked to each other through an alkylene linking group, an arylene linking group, or a linking group of a combination thereof.

Examples of the substituted or unsubstituted aliphatic hydrocarbon group represented by $R^{11}$ and $R^{12}$ include an alkyl group, an alkenyl group or an alkynyl group, which may have a substituent.

Specific examples of the alkyl group include linear, branched, or cyclic alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, and a 2-norbornyl group.

Specific examples of the alkenyl group include linear, branched, or cyclic alkenyl groups such as a vinyl group, a 1-propenyl group, a 1-butenyl group, a 1-methyl-1-propenyl group, a 1-cyclopentenyl group, and a 1-cyclohexenyl group.

Specific examples of the alkynyl group include an ethynyl group, a 1-propynyl group, a 1-butynyl group, and a 1-octynyl group.

Specific examples of the substituted or unsubstituted aryl group represented by $R^{11}$ and $R^{12}$ include one in which one to four benzene rings form a fused ring, and one in which a benzene ring and an unsaturated five-membered ring form a fused ring. Specific examples thereof include a phenyl group, a naphthyl group, an anthryl group, a phenanthryl group, an indenyl group, an acenaphthenyl group, a fluorenyl group, and a pyrenyl group.

Examples of the substituted or unsubstituted heteroaryl group represented by $R^{11}$ and $R^{12}$ include one in which one hydrogen atom on a heteroaromatic ring containing one or more hetero atoms selected from the group consisting of a nitrogen atom, an oxygen atom and a sulfur atom is eliminated to form a heteroaryl group.

Specific examples of the heteroaromatic ring containing one or more hetero atoms selected from the group consisting of a nitrogen atom, an oxygen atom and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

As the substituent which $R^{11}$ and $R^{12}$ may have, a monovalent nonmetallic atomic group excluding hydrogen can be exemplified and for example, the substituent is selected from the following substituent group Y:

(Substituent Group Y)

Halogen atom (—F, —Br, —Cl, —I), hydroxyl group, alkoxy group, aryloxy group, mercapto group, alkyl thio group, aryl thio group, alkyl dithio group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkylcarbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N'-alkyl urcido group, N',N'-dialkyl ureido group, N'-aryl ureido group, N',N'-diaryl ureido group, N'-alkyl-N'-aryl ureido group, N-alkyl ureido group, N-aryl ureido group, N'-alkyl-N-alkyl ureido group, N'-alkyl-N-aryl ureido group, N',N'-dialkyl-N-alkyl ureido group, N',N'-dialkyl-N-aryl ureido group, N'-aryl-N-alkyl ureido group, N'-aryl-N-aryl ureido group, N',N'-diaryl-N-alkyl ureido group, N',N'-diaryl-N-aryl ureido group, N'-alkyl-N'-aryl-N-alkyl ureido group, N'-alkyl-N'-aryl-N-aryl ureido group, alkoxy carbonyl amino group, aryloxy carbonyl amino group, N-alkyl-N-alkoxycarbonyl amino group, N-alkyl-N-aryloxy carbonyl amino group, N-aryl-N-alkoxycarbonyl amino group, N-aryl-N-aryloxycarbonyl amino group, formyl group, acyl group, carboxyl group and its conjugated basic group, alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group (—SO$_3$H) and its conjugated basic group, alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group, N,N-dialkyl sulfamoyl group, N-aryl sulfamoyl group, N,N-diaryl sulfamoyl group, N-alkyl-N-aryl sulfamoyl group, N-acyl sulfamoyl group and its conjugated basic group, N-alkyl sulfonyl sulfamoyl group (—SO$_2$NHSO$_2$(alkyl)) and its conjugated basic group, N-aryl sulfonyl sulfamoyl group (—SO$_2$NHSO$_2$(aryl)) and its conjugated basic group, N-alkyl sulfonyl carbamoyl group (—CONHSO2(alkyl)) and its conjugated basic group, N-aryl sulfonyl carbamoyl group (—CONHSO2(aryl)) and its conjugated basic group, alkoxy silyl group (—Si(Oalkyl)$_3$), aryloxy silyl group (—Si(Oaryl)$_3$), hydroxysilyl group (—Si(OH)$_3$) and its conjugated basic group, pohsphono group (—PO$_3$H$_2$) and its conjugated basic group, dialkyl phosphono group (—PO$_3$(alkyl)$_2$), diaryl phosphono group (—PO$_3$(aryl)$_2$), alkyl aryl phosphono group (—PO$_3$(alkyl)(aryl)), monoalkyl phosphono group (—PO$_3$H(alkyl)) and its conjugated basic group, monoaryl phosphono group (—PO$_3$H(aryl)) and its conjugated basic group, phosphonoxy group (—OPO$_3$H$_2$) and its conjugated basic group, dialkyl phosphonoxy group (—OPO$_3$(alkyl)$_2$), diaryl phosphonoxy group (—OPO$_3$(aryl)$_2$), alkyl aryl phosphonoxy group (—OPO$_3$(alkyl)(aryl)), monoalkyl phosphonoxy group (—OPO$_3$H(alkyl)) and its conjugated basic group, monoaryl phosphonoxy group (—OPO$_3$H(aryl)) and its conjugated basic group, cyano group, nitro group, aryl group, alkenyl group, and alkynyl group. In addition, if possible, these substituents may be bonded to one another or to a substituted hydrocarbon group to form a ring.

It is preferable that $R^{11}$ and $R^{12}$ in Formula (II) represent hydrogen atoms or are linked to each other through an alkylene linking group.

Specific examples of the monomer forming the repeating unit represented by Formula (II) include monomers represented by Formulae II-1 to II-12.

II-1

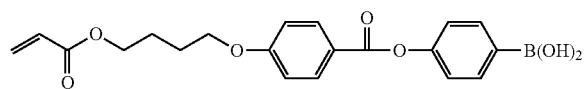

II-2

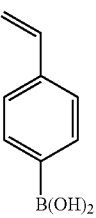

II-3

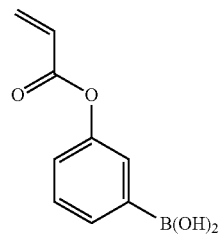

II-4

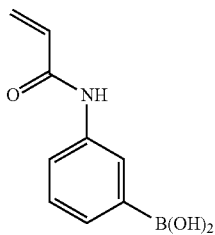

II-5

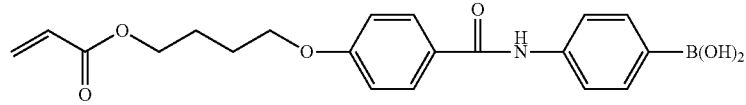

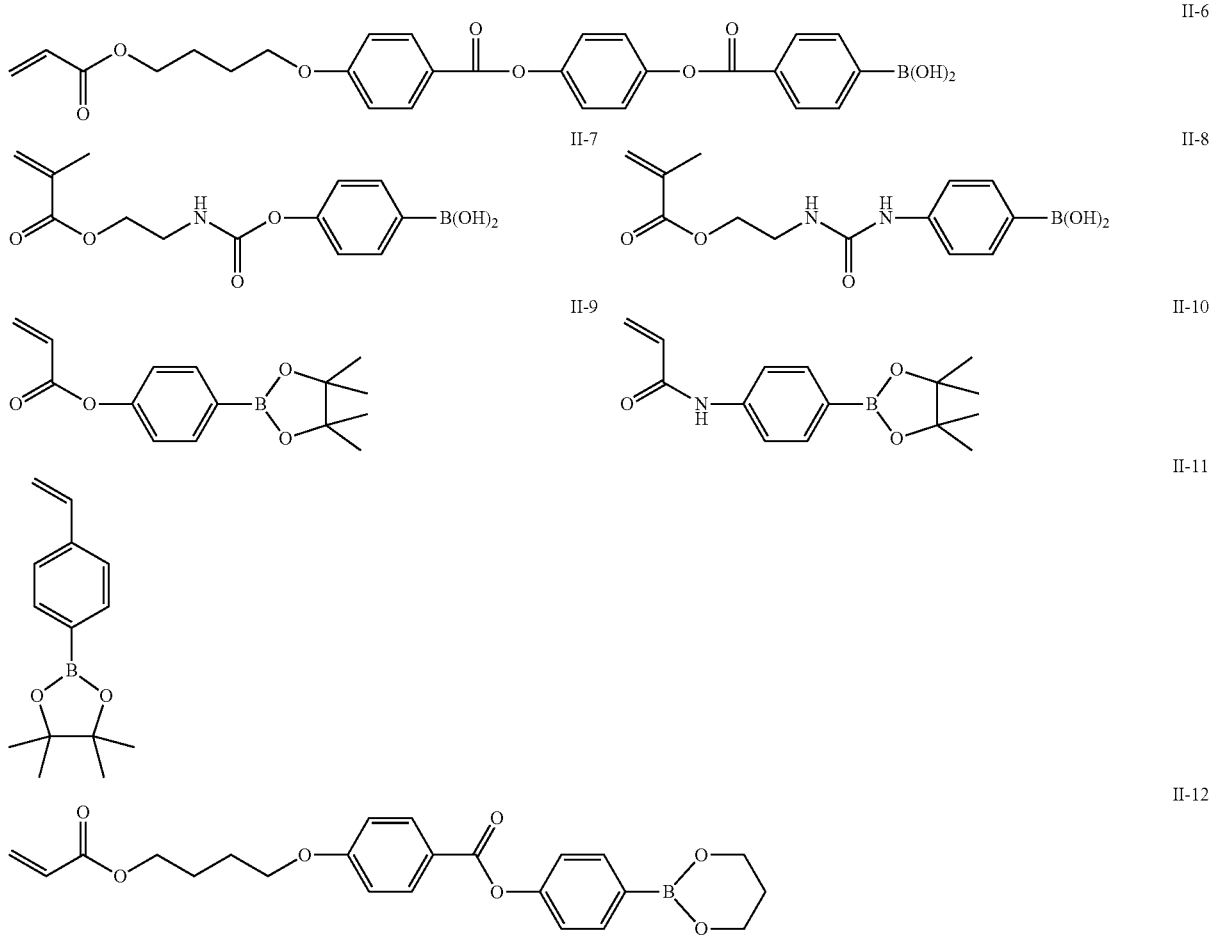

In the present invention, the content of the repeating unit represented by Formula (II) is preferably 3% to 80% by mass, more preferably 4% to 70% by mass, and even more preferably 5% to 50% by mass with respect to all repeating units.

<III Part>

It is preferable that the polymer compound of the present invention has a repeating unit (III part) represented by Formula (III) for the reason that the adhesiveness with a hydrophilic member is further improved.

Here, it is considered that the reason why the adhesiveness is further improved is that, by the copolymer having the III part, the copolymer is unevenly distributed on the air interface side of a hydrophobic member to be formed (the surface side bonded with a hydrophilic member) and thus the II part of the copolymer easily interacts with the surface of a hydrophilic member.

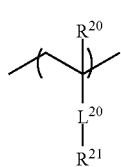

(III)

In Formula (III), $R^{20}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, a hydrogen atom or a methyl group is even more preferable.

In addition, in Formula (III), $L^{20}$ represents a divalent linking group selected from the group consisting of —O—, —COO—, —OCO—, a divalent aliphatic group, and a combination thereof. It is noted that —COO— represents that carbon to which $R^{20}$ is bonded and C=O are bonded and $R^{21}$ and O are bonded, and —OCO— represents that carbon to which $R^{20}$ is bonded and O are bonded and $R^{21}$ and C=O are bonded.

Examples of the divalent aliphatic group represented by $L^{20}$ include a divalent aliphatic chain group or a divalent aliphatic cyclic group. The divalent aliphatic chain group is preferably an alkylene group having 1 to 20 carbon atoms, and more preferably an alkylene group having 1 to 10 carbon atoms. The divalent aliphatic cyclic group is preferably a cycloalkylene group having 3 to 20 carbon atoms and more preferably a cycloalkylene group having 3 to 15 carbon atoms.

Among these, $L^{20}$ is preferably —COO— or —OCO—, and more preferably —COO—.

In addition, in Formula (III), $R^{21}$ represents an alkyl group having 4 to 20 carbon atoms, an alkyl group having 1 to 20 carbon atoms in which at least one hydrogen atom is substituted with a fluorine atom (hereinafter, also referred to as a "fluoroalkyl group"), or a monovalent organic group including —Si($R^{a3}$)($R^{a4}$)O—, and $R^{a3}$ and $R^{a4}$ each independently represent an alkyl group, a haloalkyl group, or an aryl group.

In the present invention, for the reason that the adhesiveness of a hydrophilic member to be formed with a polarizer is further improved, $R^{21}$ in Formula (III) is preferably a fluoroalkyl group having 1 to 20 carbon atoms, more preferably a fluoroalkyl group having 1 to 18 carbon atoms, and even more preferably a fluoroalkyl group having 2 to 15 carbon atoms.

In addition, the number of fluorine atoms is preferably 1 to 25, more preferably 3 to 21, and most preferably 5 to 21.

In the present invention, from the viewpoint of adhesiveness of a hydrophilic member to be formed with a polarizer and radical polymerizability, the repeating unit represented by Formula (II) is preferably a repeating unit represented by Formula (IV).

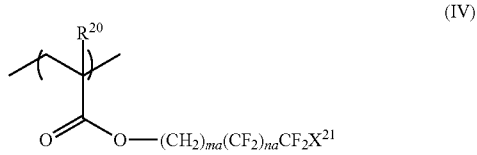

(IV)

In Formula (IV), $R^{20}$ represents a hydrogen atom or an alkyl group having 1 to 20 carbon atoms as $R^{20}$ in Formula (III) and the suitable embodiment is also the same.

In addition, in Formula (IV), ma and na each independently represent an integer of 0 to 19. Among these, from the viewpoint of adhesiveness improvement and ease of raw material availability, ma is preferably an integer of 1 to 8 and more preferably an integer of 1 to 5. Further, na is preferably an integer of 1 to 15, more preferably an integer of 1 to 12, even more preferably an integer of 2 to 10, and most preferably an integer of 5 to 7. Here, ma and na represent an integer of 0 to 19 in total.

In addition, in Formula (IV), $X^{21}$ represents a hydrogen atom or a fluorine atom and is preferably a fluorine atom.

Specific examples of a monomer forming the repeating unit represented by Formula (III) or (IV) include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl) ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H, 1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

On the other hand, it is more preferable that the monovalent organic group containing —Si($R^{a3}$)($R^{a4}$)O— represented by $R^{21}$ in Formula (III) is an organic group derived from a siloxane bond and has a structure obtained by polymerizing a compound represented by Formula (VI).

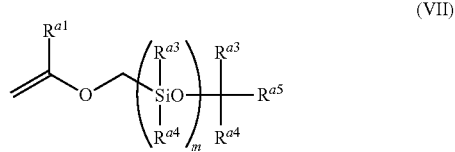

(VII)

In Formula (VII), $R^{a1}$ a hydrogen atom or an alkyl group having 1 to 20 carbon atoms, and $R^{a5}$ represents an alkyl group having 1 to 12 carbon atoms and more preferably represents an alkyl group having 1 to 4 carbon atoms.

In Formula (VII), $R^{a3}$ and $R^{a4}$ each independently represent an alkyl group, a haloalkyl group, or an aryl group.

As the alkyl group, an alkyl group having 1 to 10 carbon atoms is preferable. Examples thereof include a methyl group, an ethyl group, and a hexyl group.

As the haloalkyl group, a fluorinated alkyl group having 1 to 10 carbon atoms is preferable. Examples thereof include a trifluoromethyl group, and a pentafluoroethyl group.

As the aryl group, an aryl group having 6 to 20 carbon atoms is preferable. Examples thereof include a phenyl group, and a naphthyl group.

Among these, $R^{a3}$ and $R^{a4}$ preferably represent a methyl group, a trifluoromethyl group, or a phenyl group and particularly preferably represent a methyl group.

In Formula (VII), m represents an integer of 10 to 1000, preferably represents an integer of 20 to 500, and even more preferably represents an integer of 30 to 200.

As the compound represented by Formula (VII), a polysiloxane macromonomer containing a (meth)acryloyl group at one terminal (for example, SILAPLANE 0721, and SILAPLANE 0725 (all trade names, manufactured by JNC Corporation), AK-5, AK-30, and AK-32 (all trade names, manufactured by Toagosei Co., Ltd.), KF-100T, X-22-169AS, KF-102, X-22-37011E, X-22-164B, X-22-164C, X-22-5002, X-22-173B, X-22-174D, X-22-167B, and X-22-161AS (all trade names, manufactured by Shin-Etsu Chemical Co., Ltd.)) may be exemplified.

In the present invention, in a case where the repeating unit represented by Formula (III) is included, the content thereof is preferably 2% to 80% by mass, more preferably 5% to 70% by mass, and even more preferably 10% to 60% by mass with respect to all repeating units.

In addition, in the present invention, for the reason that the adhesiveness with a hydrophilic member is further improved, in a case where the repeating unit represented by Formula (III) is included, it is preferable that the content of the repeating unit represented by Formula (I) is 10% to 50% by mass with respect to all repeating units, the content of the repeating unit represented by Formula (II) is 5% to 50% by mass with respect to all repeating units, and the content of the repeating unit represented by Formula (III) is 10% to 60% by mass with respect to all repeating units.

<V Part>

It is preferable that the polymer compound of the present invention has a repeating unit (V part) represented by Formula (V) from the viewpoint of alignment properties in a case where a liquid crystal compound is used as a matrix component of a hydrophobic member.

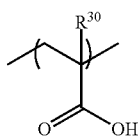

(V)

In Formula (V), $R^{30}$ represents a hydrogen atom or an alkyl group having 1 to 20 carbon atoms. Of these, a hydrogen atom or an alkyl group having 1 to 10 carbon atoms is preferable, a hydrogen atom or an alkyl group having 1 to 4 carbon atoms is more preferable, a hydrogen atom or a methyl group is even more preferable.

Specific examples of the monomer forming the repeating unit represented by Formula (V) include acrylic acid, and methacrylic acid.

In the present invention, in a case where the repeating unit represented by Formula (V) is included, the content thereof is preferably 1% to 60% by mass, more preferably 2% to 40% by mass, and even more preferably 4% to 20% by mass with respect to all repeating units.

<Other Parts>

The polymer compound of the present invention may have repeating units other than the repeating units represented by Formulae (I), (II), (III), and (V), if necessary.

As monomers forming other repeating units, monomers described in Polymer Handbook 2nd ed., J. Brandrup, Wiley Interscience (1975) Chapter 2, Pages 1 to 483 can be used.

For example, compounds having one addition polymerizable unsaturated bond selected from acrylic acid esters, methacrylic acid esters, acrylamides, methacrylamides, allyl compounds, vinyl ethers, vinyl esters, and the like can be used.

Specific examples of monomers include the following monomers.

(Acrylic Acid Esters)

Specific examples of acrylic acid esters include methyl acrylate, ethyl acrylate, propyl acrylate, chloroethyl acrylate, 2-hydroxyethyl acrylate, trimethylolpropane monoacrylate, benzyl acrylate, methoxybenzyl acrylate, phenoxyethyl acrylate, furfuryl acrylate, and tetrahydrofurfuryl acrylate.

(Methacrylic Acid Esters)

Specific examples of methacrylic acid esters include methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, phenoxyethyl methacrylate, furfuryl methacrylate, tetrahydrofurfuryl methacrylate, and ethylene glycol monoacetoacetate monomethacrylate.

(Acrylamides)

Specific examples of acrylamides include acrylamide, N-alkyl acrylamide (as the alkyl group, an alkyl group having 1 to 3 carbon atoms, for example, a methyl group, an ethyl group, or a propyl group), N,N-dialkyl acrylamide (as the alkyl group, an alkyl group having 1 to 6 carbon atoms)N-hydroxyethyl-N-methylacrylamide, and N-2-acetamidoethyl-N-acetylacrylamide.

(Methacrylamides)

Specific examples of methacrylamides include methacrylamide, N-alkyl methacrylamide (as the alkyl group, an alkyl group having 1 to 3 carbon atoms, for example, a methyl group, an ethyl group, or a propyl group), N, N-dialkyl methacrylamide (as the alkyl group, an alkyl group having 1 to 6 carbon atoms), N-hydroxyethyl-N-methylmethacrylamide, and N-2-acctamidoethyl-N-acetyl methacrylamide.

(Allyl Compounds)

Specific examples of allyl compounds include allyl esters (for example, allyl acetate, allyl caproate, allyl caprylate, allyl laurate, allyl palmitate, allyl stearate, allyl benzoate, allyl acetoacetate, and allyl lactate), and allyloxyethanol.

(Vinyl Ethers)

Specific examples of vinyl ethers include alkyl vinyl ether (for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydro furfuryl vinyl ether.

(Vinyl Esters)

Specific examples of vinyl esters include vinyl acetate, vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, and vinyl cyclohexylcarboxylate.

(Dialkyl Itaconates)

Examples of dialkyl itaconates include dimethyl itaconate, diethyl itaconate, and dibutyl itaconate.

(Others)

Examples of other monomers include dialkyl esters or monoalkyl esters of fumaric acid, dibutyl fumarate, crotonic acid, itaconic acid, acrylonitrile, methacrylonitrile, maleonitrile, styrene, styrene macromer (AS-6S manufactured by Toagosei Co., Ltd.), and methyl methacrylate macromer (AA-6, manufactured by Toagosei Co., Ltd.).

In the present invention, in a case where other repeating units are included, the content thereof is preferably 1% to 50% by mass, more preferably 1% to 30% by mass, and even more preferably 1% to 20% by mass with respect to all repeating units.

The weight-average molecular weight (Mw) of the polymer compound of the present invention is preferably 1000 to 200000, more preferably 1500 to 100000, and even more preferably 3000 to 60000.

The number average molecular weight (Mn) of the polymer compound of the present invention is preferably 500 to 40000, more preferably 600 to 35000, and even more preferably 600 to 30000.

The distribution (Mw/Mn) of the polymer compound of the present invention is preferably 1.00 to 12.00, more preferably 1.00 to 11.00, and even more preferably 1.00 to 10.00.

The weight-average molecular weight and the number average molecular weight are values measured by gel permeation chromatography (GPC) under the following conditions.

<Measurement Conditions>

[Eluent] N-methyl-2-pyrrolidone (NMP)

[Apparatus name] EcoSEC HLC-8320GPC (manufactured by Tosoh Corporation)

[Column] TSKgel Super AWM-H (manufactured by Tosoh Corporation)

[Column temperature] 40° C.

[Flow rate] 0.50 ml/min

Specific examples of the polymer compound of the present invention having each repeating unit described above include compounds represented by Formulae (A-1) to (A-22).

(A-1)
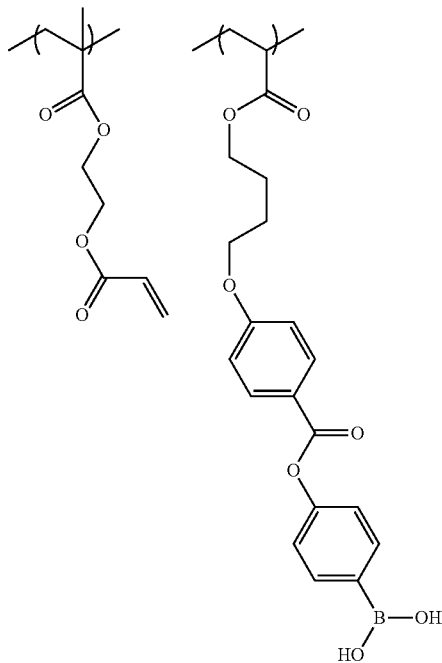
(A-2)
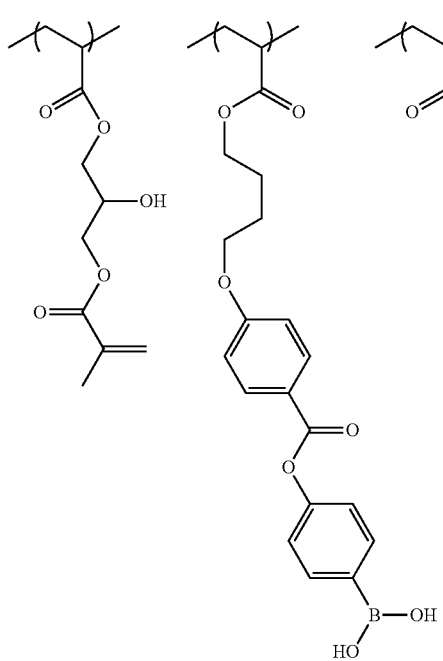
(A-3)
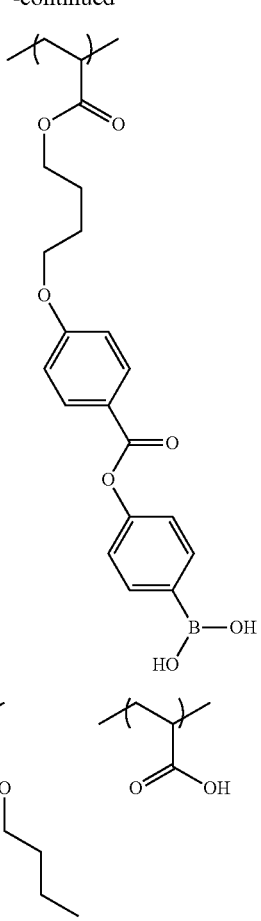
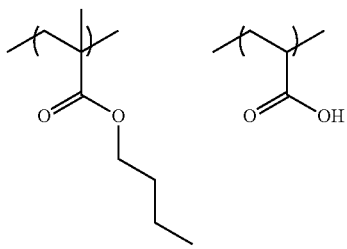
(A-4)
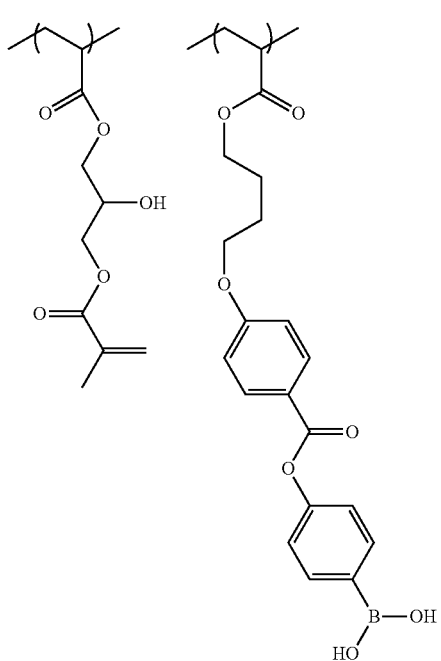

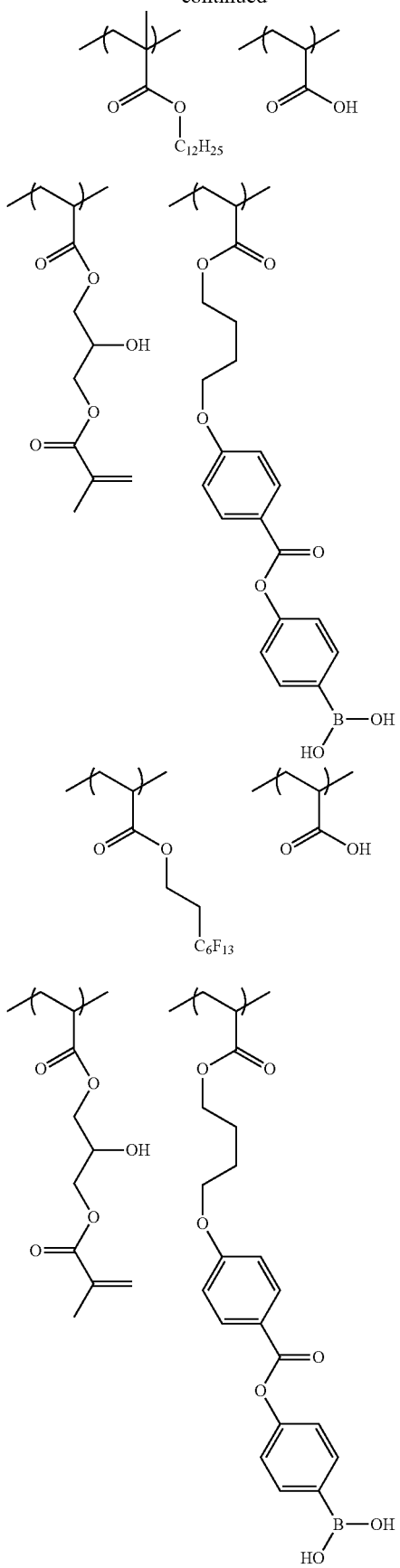
(A-5)
(A-6)
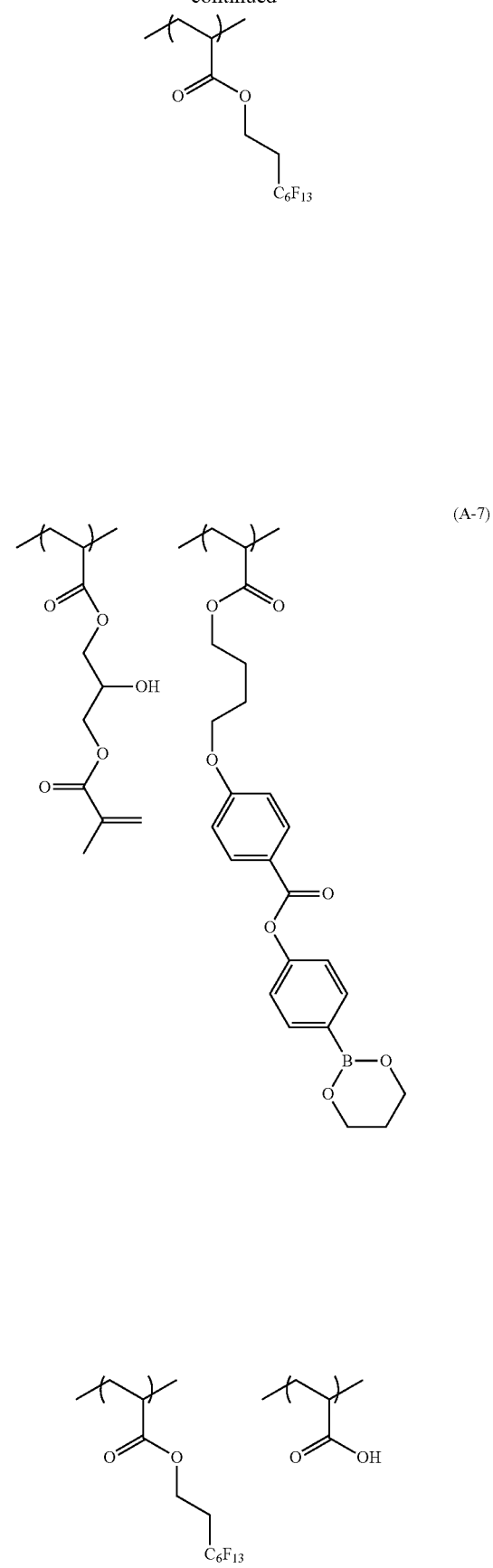
(A-7)

(A-8)
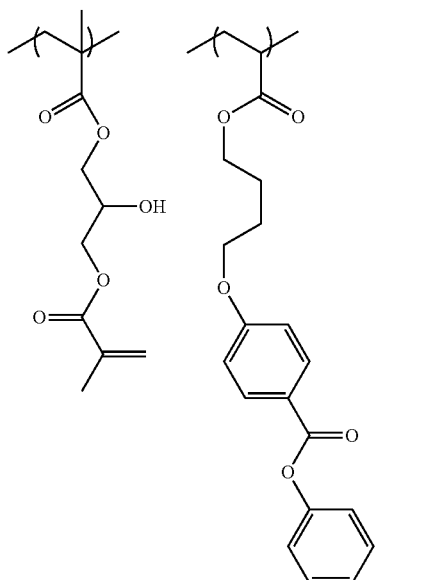
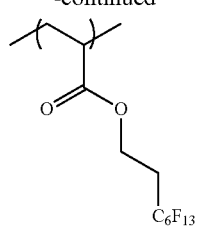
(A-9)
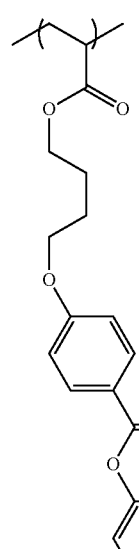
(A-10)
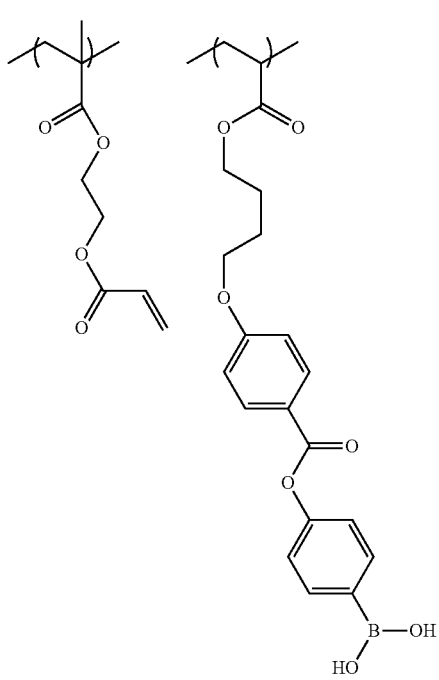
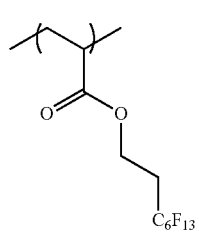

(A-11)
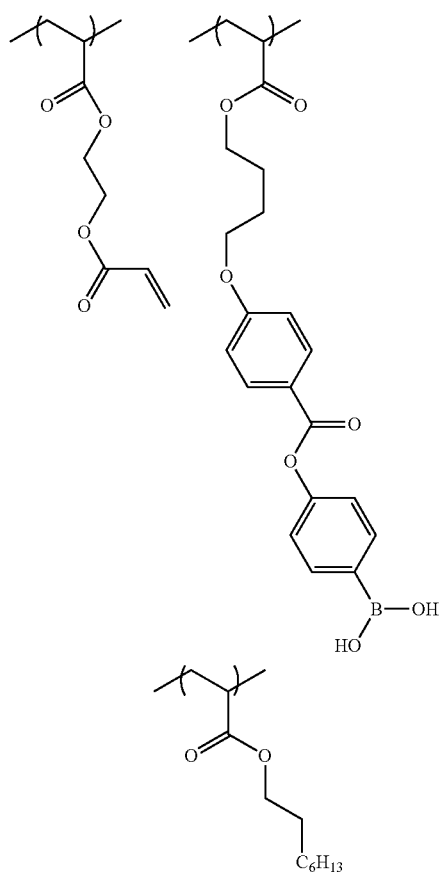
(A-12)
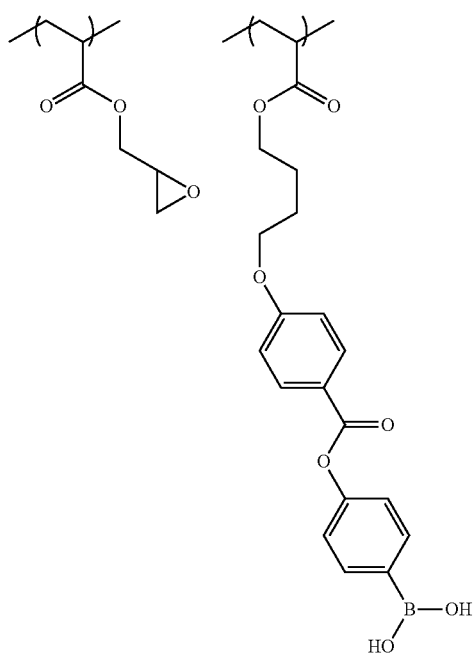
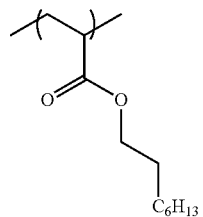
(A-13)
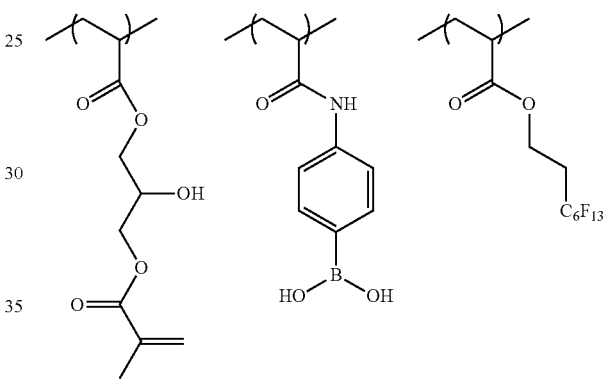
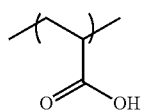
(A-14)
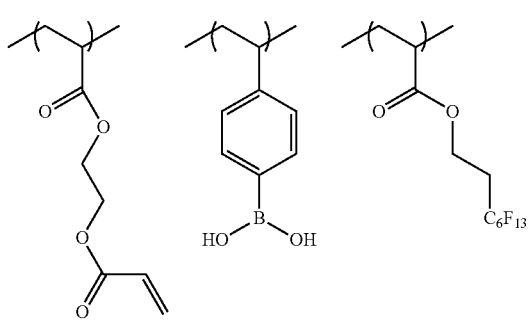

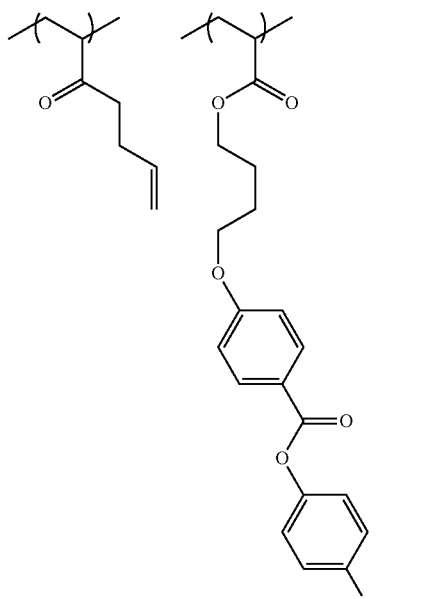
(A-15)
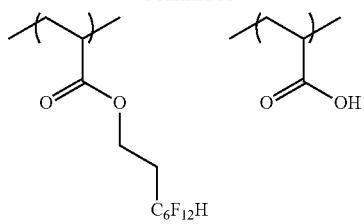
(A-17)
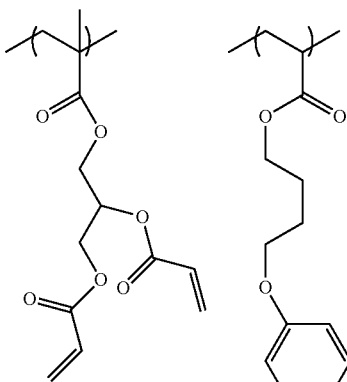
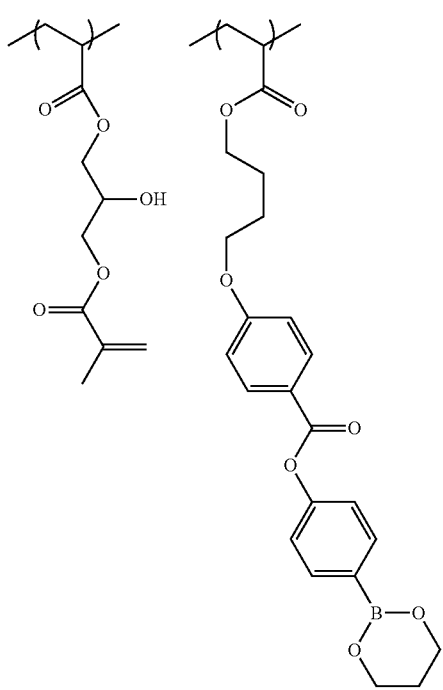
(A-16)

(F-18)
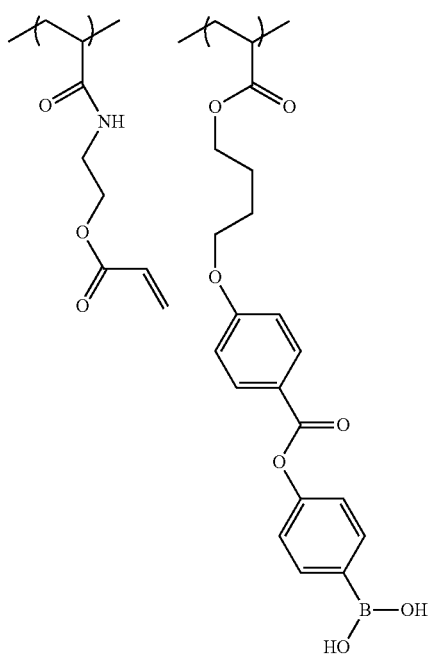
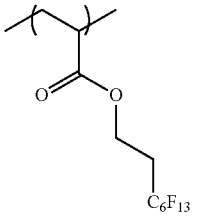
(A-19)
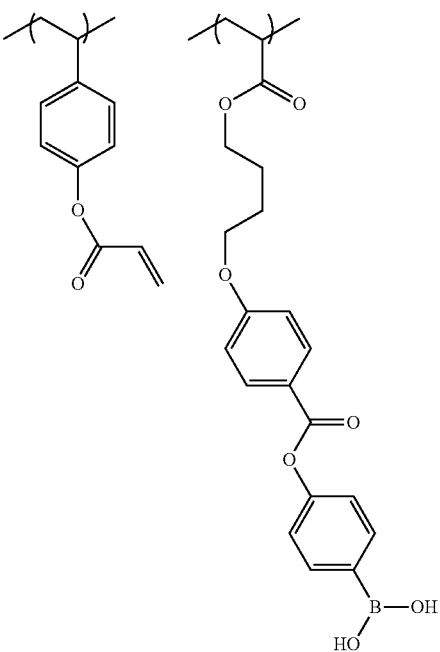
(A-20)
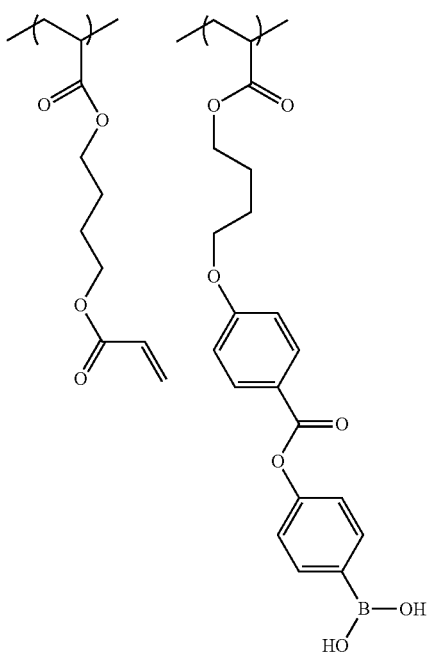
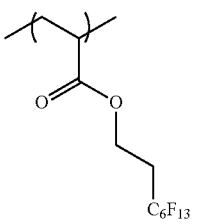

(A-21)

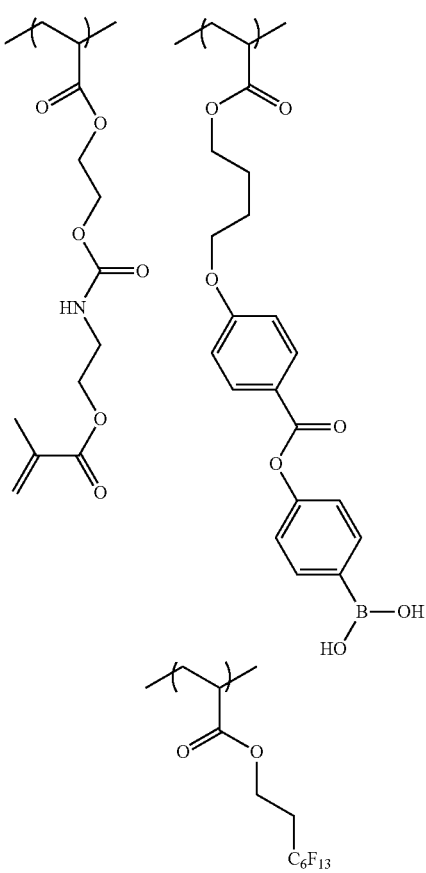

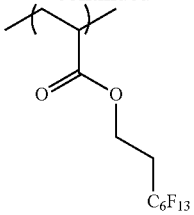

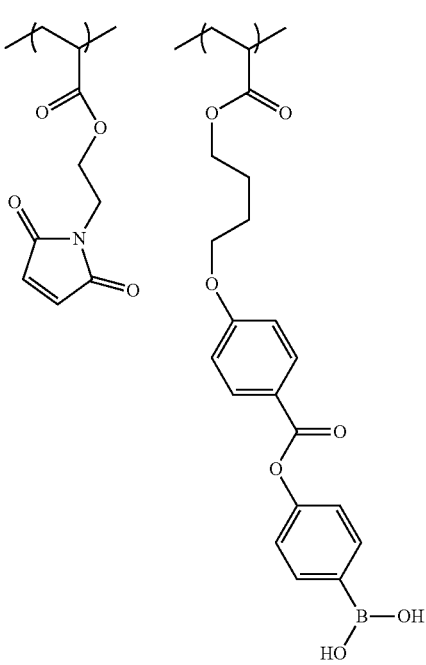

(A-22)

In a case where the total solid content of a composition for forming a hydrophobic member is set to 100% by mass, the polymer compound according to the embodiment of the present invention is used at a content of, preferably 0.0001% to 40% by mass, more preferably 0.001% to 20% by mass, and even more preferably 0.1% to 5% by mass.

[Application]

As described above, the polymer compound according to the embodiment of the present invention is useful for an application for improving adhesiveness between a hydrophobic member and a hydrophilic member, that is, as an adhesiveness imparting agent.

In addition, the composition for forming a hydrophobic member is not particularly limited as long as the composition includes the polymer compound according to the embodiment of the present invention. Examples of other components include a liquid crystal compound, an ink, a paint, and a binder resin. Among these, a liquid crystal compound is preferable.

On the other hand, as the hydrophilic member, for example, a polarizer, particularly, a polarizer containing a polyvinyl alcohol-based resin (a polymer containing —$CH_2$—CHOH— as a repeating unit, particularly, at least one selected from the group consisting of polyvinyl alcohol and an ethylene-vinyl alcohol copolymer) may be suitably used.

EXAMPLES

The present invention will be described in more detail based on the following Examples. The materials, amount of use, ratio, ratio, details of the treatment, procedures of the treatment, and the like shown in the following Examples can be appropriately changed without departing from the spirit of the present invention. Therefore, it is to be understood that the scope of the present invention should not be interpreted in a limited manner based on Examples shown below.

Synthesis Example 1

<Synthesis Example of Copolymer A-5 >

Into a 300 ml three-neck flask equipped with a stirrer, a thermometer, a reflux condenser, and a nitrogen gas introduction pipe, 6.7 g of cyclohexanone and 1.7 g of isopropanol were put and the temperature was raised to 73° C.

Next, a mixed solution of 12.3 g (29.3 mmol) of 2-(perfluorohexyl)ethyl acrylate, 5.6 g (14.7 mmol) of 4-(4-acryloyloxybutoxy)benzoyloxy phenyl boronic acid, 2.1 g (29.3 mmol) of acrylic acid, 26.4 g of cyclohexanone, 6.6 g of isopropanol, and 0.51 g of an azo polymerization initiator (V-601, manufactured by Wako Pure Chemical Corporation) was added dropwise at a constant rate so that the dropwise addition was completed in 150 minutes. After completion of the dropwise addition, the temperature was raised to 90° C., and stirring was further continued for 4 hours.

Next, 4.2 g (29.3 mmol) of glycidyl methacrylate, 1.5 g (4.7 mmol) of tetrabutylammonium bromide, 0.4 g of p-methoxyphenol, 16.2 g of cyclohexanone, and 4.1 g of isopropanol were put into the flask, the temperature was raised to 80° C., and stirring was continued for 8 hours. Thus, 88.6 g of a cyclohexanone.isopropanol solution of a copolymer represented by Formula (A-5) (hereinafter, abbreviated as a "copolymer A-5") was obtained.

The weight-average molecular weight (Mw) of the copolymer A-5 was 60,300 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the obtained copolymer A-5 had an acid value of 7.3 and the residual carboxylic acid content was 5% by mole.

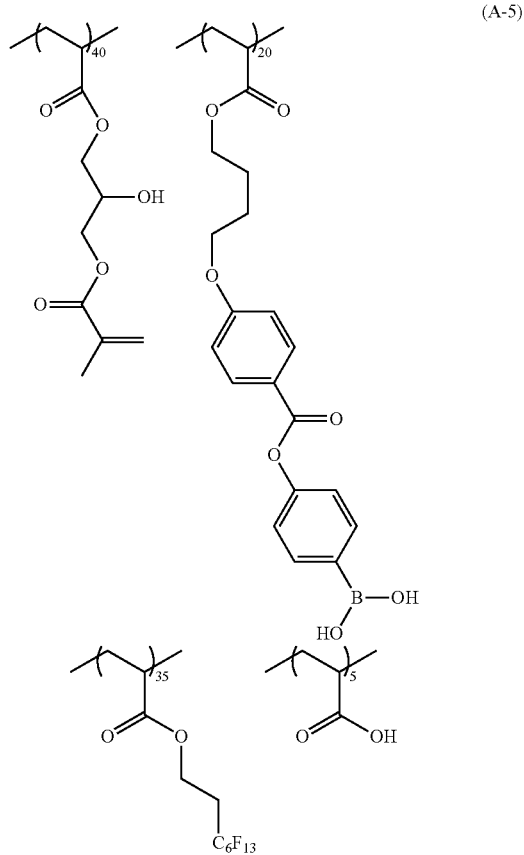

Synthesis Example 2

<Synthesis Example of Copolymer A-7>

Into a 300 ml three-neck flask equipped with a stirrer, a thermometer, a reflux condenser, and a nitrogen gas introduction pipe, 6.7 g of cyclohexanone and 1.7 g of isopropanol were put and the temperature was raised to 73° C. Next, a mixed solution of 12.3 g (29.3 mmol) of 2-(perfluorohexyl)ethyl acrylate, 5.6 g (14.7 mmol) of 4-(4-acryloyloxybutoxy)benzoyloxy phenyl boronic acid, 2.1 g (29.3 mmol) of acrylic acid, 26.4 g of cyclohexanone, 6.6 g of isopropanol, and 0.51 g of an azo polymerization initiator (V-601, manufactured by Wako Pure Chemical Corporation) was added dropwise at a constant rate so that the dropwise addition was completed in 150 minutes. After 1.3 g of 1,3-propanediol was added, the temperature was raised to 90° C., and stirring was further continued for 4 hours.

Next, 4.2 g (29.3 mmol) of glycidyl methacrylate, 1.5 g (4.7 mmol) of tetrabutylammonium bromide, 0.4 g of p-methoxyphenol, 18.0 g of cyclohexanone, and 4.5 g of isopropanol were put into the flask, the temperature was raised to 80° C., and stirring was continued for 8 hours. Thus, 91.9 g of a cyclohexanone-isopropanol solution of a copolymer represented by Formula (A-7a) (hereinafter, abbreviated as a "copolymer A-7a") was obtained.

The weight-average molecular weight (Mw) of the copolymer A-7a was 11,200 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the obtained copolymer A-7a had an acid value of 5.2 and the residual carboxylic acid content was 3% by mole.

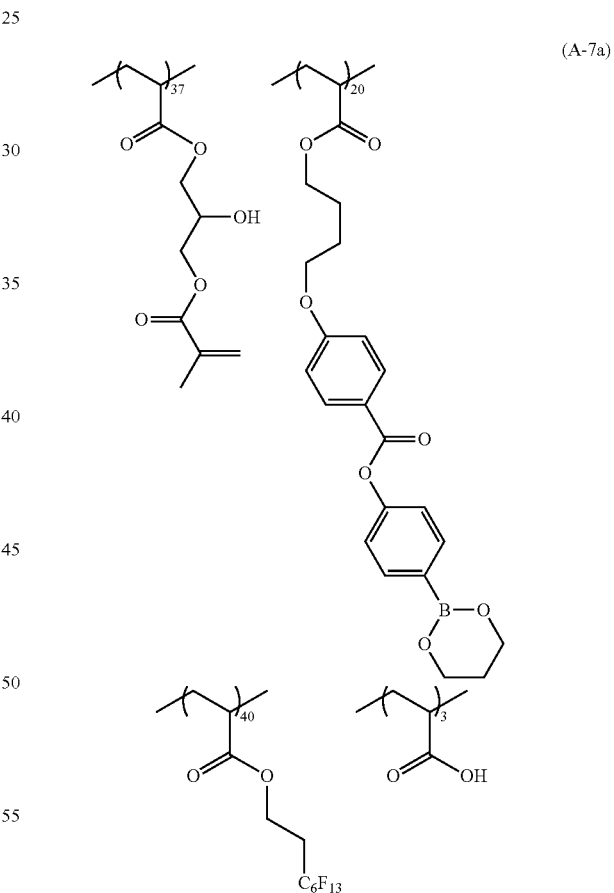

Other Synthesis Examples

A copolymer represented by Formula (A-1) (hereinafter, abbreviated as a "copolymer A-1"), a copolymer represented by Formula (A-4) (hereinafter, abbreviated as a "copolymer A-4"), a copolymer represented by Formula (A-7b) (hereinafter, abbreviated as a "copolymer A-7b"), a copolymer represented by Formula (A-7c) (hereinafter, abbreviated as a "copolymer A-7c"), and a copolymer represented by Formula (A-11) (hereinafter, abbreviated as a "copolymer A-11") were synthesized in the same manner as in Synthesis Examples 1 and 2 described above except that the monomer components were changed.
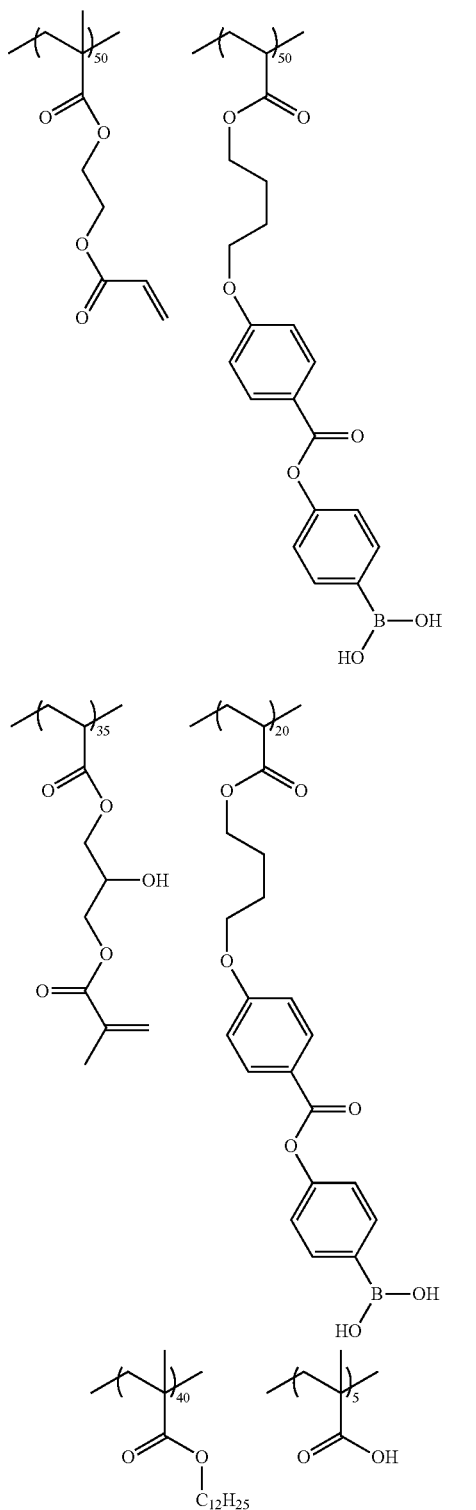
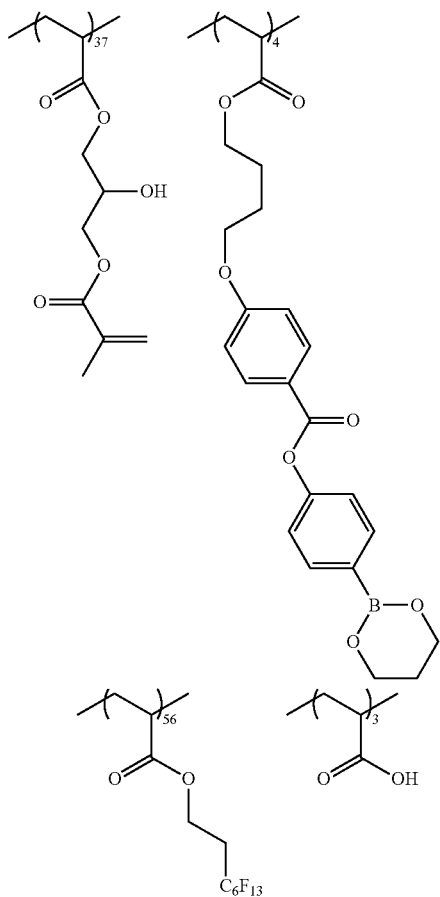
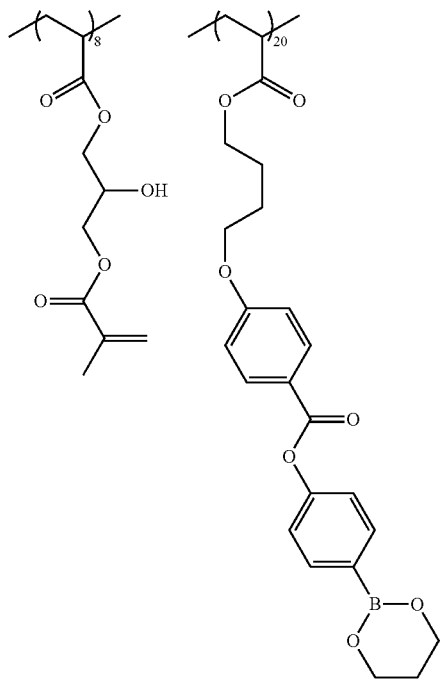

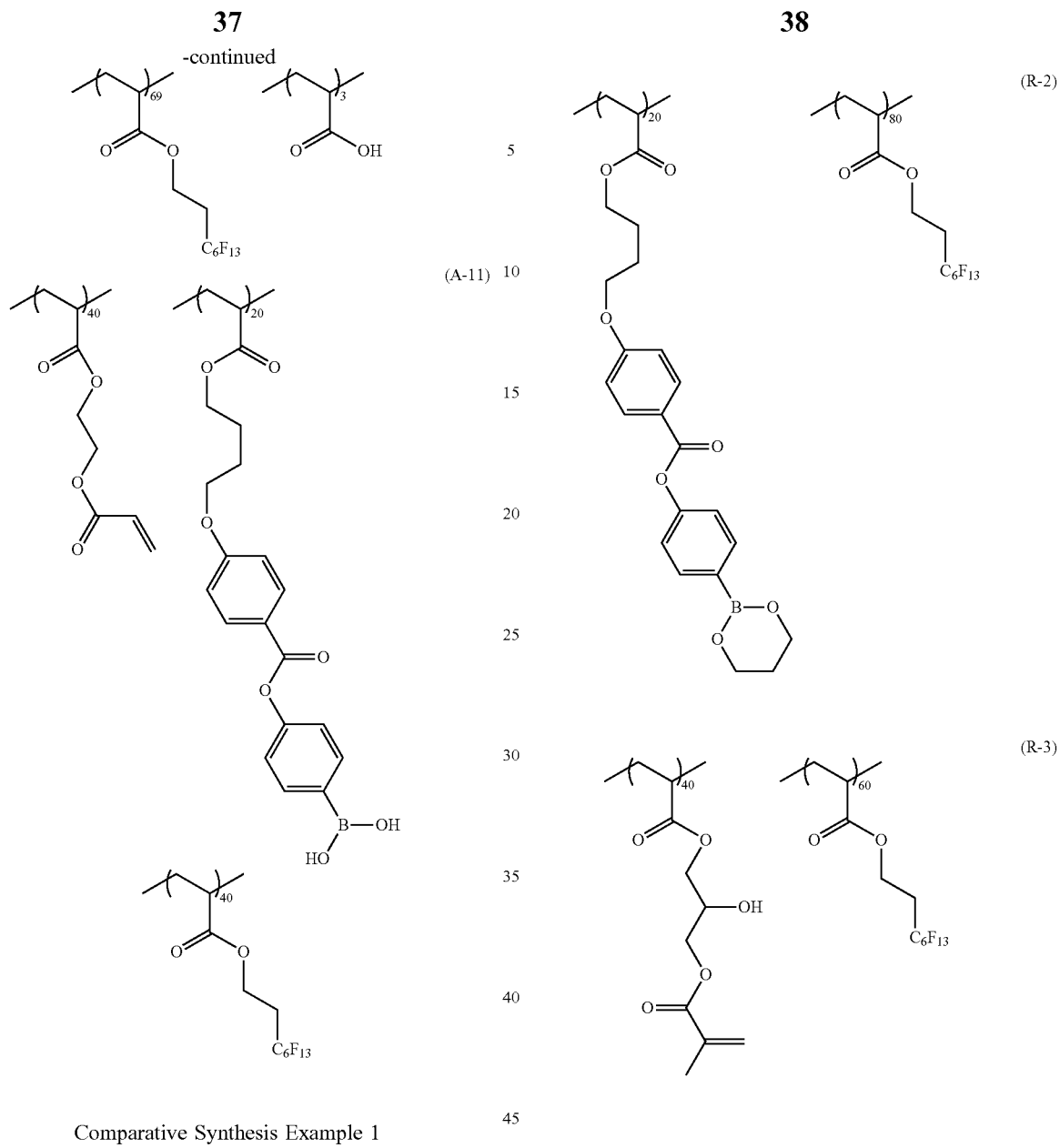

(A-11)

Comparative Synthesis Example 1

A copolymer R-1 was synthesized according to the method described in paragraph of JP2005-248116A.

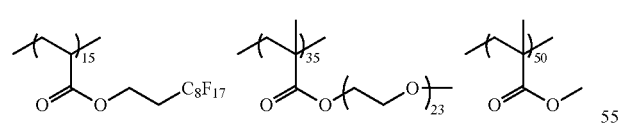

Comparative Synthesis Examples 2 to 4

A copolymer represented by Formula (R-2) (hereinafter, abbreviated as a "copolymer R-2"), a copolymer represented by Formula (R-3) (hereinafter, abbreviated as a "copolymer R-3"), and a copolymer represented by Formula (R-4) (hereinafter, abbreviated as a "copolymer R-4") were synthesized in the same manner as in Synthesis Example 2 described above except that the monomer components were changed.

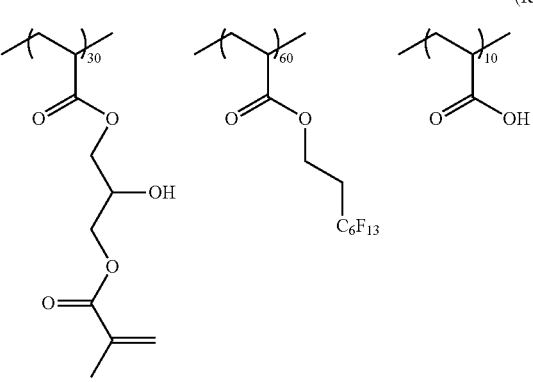

Regarding each synthesized copolymers, the contents (% by mass) of the repeating units represented by Formulae (I), (II), (III), and (V) and other repeating units are shown in Table 1 below.

TABLE 1

| Copolymer | Repeating unit represented by Formula (I) % by mass | Repeating unit represented by Formula (II) % by mass | Repeating unit represented by Formula (III) % by mass | Repeating unit represented by Formula (V) % by mass | Other repeating units % by mass |
|---|---|---|---|---|---|
| A-1 | 50% | 50% | 0% | 0% | 0% |
| A-4 | 35% | 20% | 0% | 5% | 40% (—$C_{12}H_{25}$) |
| A-5 | 40% | 20% | 35% | 5% | 0% |
| A-7a | 37% | 20% | 40% | 3% | 0% |
| A-7b | 37% | 4% | 56% | 3% | 0% |
| A-7c | 8% | 20% | 69% | 3% | 0% |
| A-11 | 40% | 20% | 40% | 0% | 0% |
| R-1 | 0% | 0% | 15% | 0% | 85% |
| R-2 | 0% | 20% | 80% | 0% | 0% |
| R-3 | 40% | 0% | 60% | 0% | 0% |
| R-4 | 30% | 0% | 60% | 10% | 0% |

Examples 1 to 9 and Comparative Examples 1 to 5

<Preparation of Optical Film>

Each synthesized copolymer, each liquid crystal compound shown in Tables 2 to 4 below, and the like were mixed in parts by mass shown in Tables 2 to 4 below and thus liquid crystal compositions were prepared.

In addition, one surface of a cycloolefin polymer film (trade name: ARTON film, manufactured by JSR Corporation, Re=95 nm, Rth=100 nm, film thickness: 25 μm) was subjected to a corona treatment at a discharge amount of 125 W·min/m$^2$.

Thereafter, each prepared liquid crystal composition was applied to the corona-treated surface with a #2.6 wire bar. In order to dry the solvent of the composition and carry out alignment and aging of the liquid crystal compound, heating was performed for 90 seconds with hot air at 70° C.

Next, the film was then irradiated with ultraviolet rays (300 mJ/cm$^2$) at 40° C. under a nitrogen purge with an oxygen concentration of 100 ppm and the alignment of the liquid crystal compound was immobilized. Thus, an optical film was prepared.

As the liquid crystal compound, the alignment aid, the boron compound, the monomer, the polymerization initiator, and the leveling agent shown in Tables 2 to 4 below, the followings were respectively used.

Liquid Crystal Compound G1

Mixture of liquid crystal compounds (RA), (RB), and (RC) below at 83:15:2 (mass ratio)

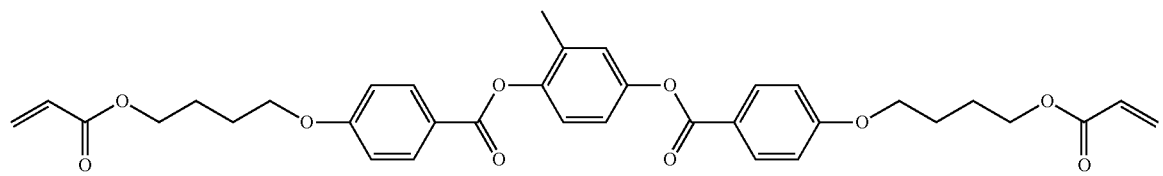

(RA)

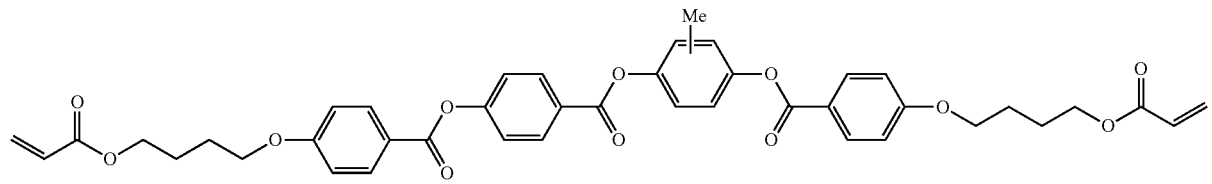

(RB)

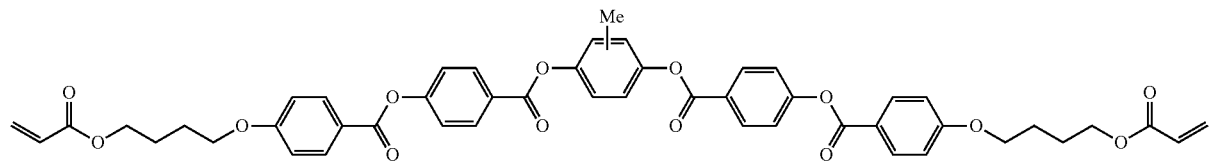

(RC)

Alignment aid H1

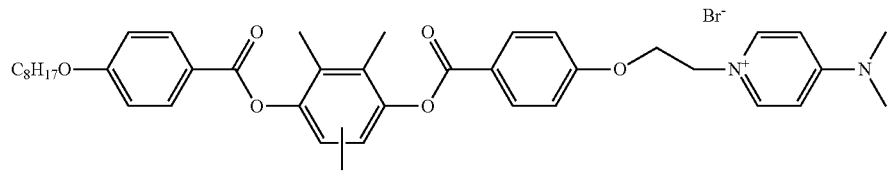

Boron compound J1

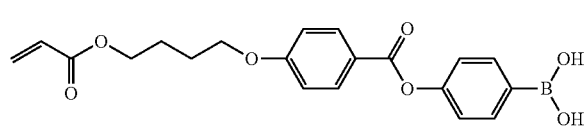 [SMILES: C=CC(=O)OCCCCOc1ccc(C(=O)Oc2ccc(B(O)O)cc2)cc1]

Monomer K1: BISCOAT #360 (manufactured by Osaka Organic Chemical Industry Ltd.)
Polymerization initiator L1: OXE-01 (manufactured by BASF A.G)
Leveling agent M1

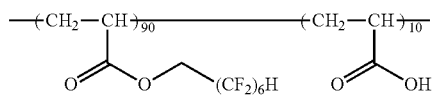

<Preparation of Polarizing Plate>
(Surface Treatment of Film)

A cellulose acetate film (FUJITAC TD40UC, manufactured by Fujifilm Corporation) was immersed in 1.5 mol/L of an aqueous solution of sodium hydroxide (saponification solution) controlled to a temperature of 37° C. for 1 minute and then the film was washed with water. Then, the film was immersed in 0.05 mol/L of an aqueous solution of sulfuric acid for 30 seconds, and further passed through a water washing bath. Then, draining with an air knife was repeated three times, water dripping was performed, and then the film was dried by being retained in a drying zone at 70° C. for 15 seconds. Thus, a cellulose acetate film which was subjected to a saponification treatment was prepared.

<Preparation of Polarizer>

According to Example 1 of JP2001-141926A, a difference in a circumferential speed was imparted to two pairs of nip rolls, stretching was performed in a longitudinal direction, and thus a polarizer having a thickness 12 μm was prepared.

<Lamination>

The prepared polarizer was sandwiched by using each prepared optical film and the prepared saponified cellulose acetate film and then the films and the polarizer were laminated using the following adhesive by a roll-to-roll method such that the absorption axis of the polarizer and the longitudinal direction of the film were parallel to each other.

Here, one surface of the polarizer was arranged such that the coated surface of the above-described optical film was disposed on the polarizer side and the other surface of the polarizer was the above-described cellulose acetate film.

After lamination, the laminate was cured by drying at 70° C. for 10 minutes to prepare a polarizing plate.

(Adhesive)

3% aqueous solution of polyvinyl alcohol (PVA-117H, manufactured by Kuraray Co., Ltd.)

Alignment Properties

Regarding the optically anisotropic layer of the prepared optical film, a value of |Rth(550)| with respect to a film thickness of 1 μm of the optically anisotropic layer was calculated and the alignment properties were evaluated according to the following standards. The results are shown in Tables 2 to 4 below.

In a case where the same liquid crystal compound is used, the higher the alignment properties, the larger the value of |Rth(550)| with respect to a film thickness of 1 μm of the optically anisotropic layer.

Therefore, the alignment properties were evaluated by the value of |Rth(550)| with respect to a film thickness of 1 μm of the optically anisotropic layer.

A: 120 nm/μm or greater
B: 110 nm/μm or greater and less than 120 nm/μm
C: 100 nm/μm or greater and less than 110 nm/μm
D: less than 100 nm/μm Here, in a case where the evaluation results are A, B and C, there is no practical problem and the evaluation is preferably A.

Surface State

Each polarizing plate was disposed to form crossed nicols, the prepared optical film was inserted between the polarizing plates, and the planar performance of the optically anisotropic layer of the prepared optical film was observed.

The extent of unevenness was visually evaluated and evaluated at four stages A to D. The results are shown in the following Tables 2 to 4 below.

A: Unevenness was not observed at all.
B: Slight unevenness was visually recognized but not noticeable.
C: Unevenness was visually recognized but was not a practically problematic level.
D: Unevenness was clearly visually recognized and very noticeable.

Adhesiveness

The adhesiveness was evaluated by a crosscut method described in JIS-K-5600-5-6-1.

The optical film surface of the prepared polarizing plate was cut at intervals of 1 mm to form 100 cross cuts and an adhesion test was performed using a cellophane tape (manufactured by Nichiban Co., Ltd.). After attaching a new cellophane tape, the cellophane tape was peeled off and the surface state was evaluated according to the following standards. The results are shown in Tables 2 to 4 below. The crosscuts were formed by making cuts from the cycloolefin polymer film (support) side of the optical film to the surface of the polarizer.

A: Squares of the cross cuts were not peeled off.
B: 50% or more and less than 100% of squares of the cross cuts were not peeled off.
C: 20% or more and less than 50% of squares of the cross cuts were not peeled off.
D: Less than 20% of squares of the cross cuts were not peeled off.

Here, in a case where the evaluation results are A, B and C, there is no practical problem and the evaluation is preferably A.

TABLE 2

|  | Comparative Example 1 | | Comparative Example 2 | | Comparative Example 3 | | Comparative Example 4 | | Comparative Example 5 | |
| --- | --- | --- | --- | --- | --- | --- | --- | --- | --- | --- |
|  | Kind | Parts by mass | Kind | Parts by mass | Kind | Parts by mass | Kind | Parts by mass | Kind | Parts by mass |
| Liquid crystal compound | G1 | 100 | G1 | 100 | G1 | 100 | G1 | 100 | G1 | 100 |
| Alignment aid | H1 | 1 | H1 | 1 | H1 | 1 | H1 | 1 | H1 | 1 |
| Boron compound | J1 | 4.5 | J1 | 4.5 | J1 | 4.5 | J1 | 4.5 | J1 | 4.5 |
| Monomer | K1 | 8 | K1 | 8 | K1 | 8 | K1 | 8 | K1 | 8 |
| Polymerization initiator | L1 | 5 | L1 | 5 | L1 | 5 | L1 | 5 | L1 | 5 |
| Leveling agent Copolymer |  |  | R-1 | 0.5 | R-2 | 5.0 | R-3 | 5.0 | R-4 | 5.0 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid concent | 25% | | 25% | | 25% | | 25% | | 25% | |
| Alignment properties | D | | D | | D | | D | | A | |
| Surface state | D | | A | | D | | D | | A | |
| Adhesiveness | D | | D | | D | | D | | D | |

TABLE 3

|  | Example 1 | | Example 2 | | Example 3 | | Example 4 | | Example 5 | |
| --- | --- | --- | --- | --- | --- | --- | --- | --- | --- | --- |
|  | Kind | Parts by mass | Kind | Parts by mass | Kind | Parts by mass | Kind | Parts by mass | Kind | Parts by mass |
| Liquid crystal compound | G1 | 100 | G1 | 100 | G1 | 100 | G1 | 100 | G1 | 100 |
| Alignment aid | H1 | 1 | H1 | 1 | H1 | 1 | H1 | 1 | H1 | 1 |
| Boron compound |  |  |  |  | J1 | 4.5 | J1 | 4.5 | J1 | 4.5 |
| Monomer | K1 | 8 | K1 | 8 | K1 | 8 | K1 | 8 | K1 | 8 |
| Polymerization initiator | L1 | 5 | L1 | 5 | L1 | 5 | L1 | 5 | L1 | 5 |
| Leveling agent Copolymer | A-1 | 5.0 | A-4 | 5.0 | A-11 | 0.5 | A-5 | 0.5 | A-7a | 0.5 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid concent | 25% | | 25% | | 25% | | 25% | | 25% | |
| Alignment properties | C | | C | | B | | A | | A | |
| Surface state | C | | C | | A | | A | | A | |
| Adhesiveness | C | | B | | A | | A | | A | |

TABLE 4

|  | Example 6 | | Example 7 | | Example 8 | | Example 9 | |
| --- | --- | --- | --- | --- | --- | --- | --- | --- |
|  | Kind | Parts by mass | Kind | Parts by mass | Kind | Parts by mass | Kind | Parts by mass |
| Liquid crystal compound | G1 | 100 | G1 | 100 | G1 | 100 | G1 | 100 |
| Alignment aid | H1 | 1 | H1 | 2 | H1 | 2 | H1 | 2 |
| Boron compound |  |  | J1 | 4.5 | J1 | 4.5 | J1 | 4.5 |
| Monomer | K1 | 8 | K1 | 8 | K1 | 8 | K1 | 8 |
| Polymerization initiator | L1 | 5 | L1 | 5 | L1 | 5 | L1 | 5 |
| Leveling agent |  |  | M1 | 0.3 | M1 | 0.3 | M1 | 0.3 |
| Copolymer | A-7a | 0.5 | A-7a | 0.5 | A-7b | 0.5 | A-7c | 0.5 |
| Solvent | Acetone (70%) Methyl acetate (20%) Methanol (10%) | | Acetone (70%) Methyl acetate (20%) Methanol (10%) | | Acetone (70%) Methyl acetate (20%) Methanol (10%) | | Acetone (70%) Methyl acetate (20%) Methanol (10%) | |
| Concentration of solid concent | 25% | | 25% | | 25% | | 25% | |
| Alignment properties | A | | A | | A | | A | |
| Surface state | A | | A | | A | | A | |
| Adhesiveness | B | | A | | C | | C | |

From the results shown in Tables 2 to 4, it was found that in a case where the polymer compound of the present invention was not blended, the adhesiveness between the polarizer and the optically anisotropic layer was inferior and the alignment properties and the surface state were also inferior (Comparative Examples 1 to 5).

In contrast, in a case where the polymer compound of the present invention was blended, it was found that the alignment properties were excellent, the surface state of the optically anisotropic layer to be formed was improved, and the adhesiveness with the polarizer was also improved (Examples 1 to 9).

Particularly, from the comparison between Example 3 and Example 4, it was found that the alignment properties of the liquid crystal compound were improved in a case where the copolymer has the repeating unit (V part) represented by Formula (V).

In addition, from the comparison between Example 5 and Example 6, it was found that the adhesiveness with the polarizer was improved in a case where the copolymer has the boron compound represented by Formula (VI).

Further, from the comparison of Examples 7 to 9, it was found that in a case where the content of the repeating unit represented by Formula (I) is 10% to 50% by mass with respect to all repeating units, the content of the repeating unit represented by Formula (II) is 5% to 50% by mass with respect to all repeating units, and the content of the repeating unit represented by Formula (III) is 10% to 60% by mass with respect to all repeating units, the adhesiveness with the polarizer was further improved.

What is claimed is:

1. A polymer compound comprising:

a repeating unit represented by formula (I);

a repeating unit represented by formula (II); and a repeating unit represented by formula (III),

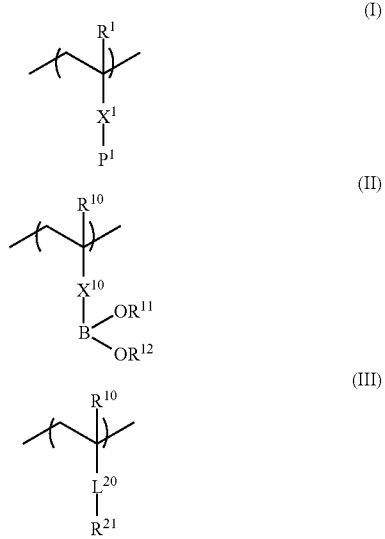

in formula (I), $R^1$ represents a hydrogen atom or an alkyl group having 1 to 20 carbon atoms; $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —X$^1$—P$^1$; and P$^1$ represents a polymerizable group, in formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other through an alkylene linking group, an arylene linking group, or a linking group of a combination thereof; $X^{10}$ represents a single bond or a divalent linking group selected from the group consisting of —O—, —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms, in formula (III), $R^{20}$ represents a hydrogen atom or an alkyl group having 1 to 20 carbon atoms; $R^{21}$ represents an alkyl group having 4 to 20 carbon atoms, an alkyl group having 1 to 20 carbon atoms in which at least one hydrogen atom is substituted with a fluorine atom, or a monovalent organic group including —Si($R^{a3}$)($R^{a4}$)O—; $R^{a3}$ and $R^{a4}$ each independently represent an alkyl group, a haloalkyl group, or an aryl group; and $L^{20}$ represents a divalent linking group selected from the group consisting of —O—, —COO—, —OCO—, a divalent aliphatic group, and a combination thereof, and wherein the polymerizable group represented by $P^1$ in formula (I) is any polymerizable group selected from the group consisting of groups represented by formulae (P-1) to (P-7),

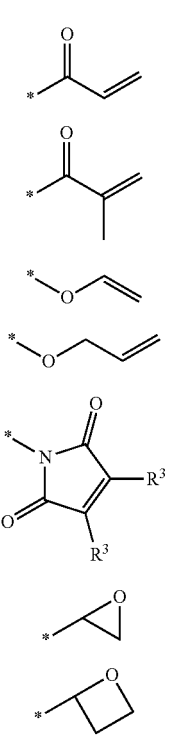

in formulae (P-1) to (P-7), * represents a bonding position with $X^1$; $R^3$ represents a hydrogen atom or an alkyl group having 1 to 5 carbon atoms; and two $R^3$'s may be the same or different from each other and may be linked to each other to form a ring structure.

2. The polymer compound according to claim 1,
wherein the polymerizable group represented by $P^1$ in formula (I) is any polymerizable group selected from the group consisting of groups represented by formulae (P-1) to (P-3),

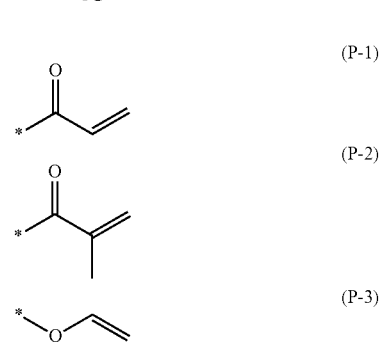

in formulae (P-1) to (P-3), * represents a bonding position with $X^1$.

3. The polymer compound according to claim 2,
wherein $R^1$ in formula (I) is a hydrogen atom or a methyl group, and $X^1$ in formula (I) is a divalent linking group selected from the group consisting of —O—, —COO—, —OCO—, a substituted or unsubstituted divalent aliphatic group, and a combination thereof.

4. The polymer compound according to claim 1,
wherein $R^1$ in formula (I) is a hydrogen atom or a methyl group, and $X^1$ in formula (I) is a divalent linking group selected from the group consisting of —O—, —COO—, —OCO—, a substituted or unsubstituted divalent aliphatic group, and a combination thereof.

5. The polymer compound according to claim 1,
wherein $R^{21}$ in formula (III) is an alkyl group having 1 to 20 carbon atoms in which at least one hydrogen atom is substituted with a fluorine atom.

6. The polymer compound according to claim 5,
wherein the repeating unit represented by formula (III) is a repeating unit represented by formula (IV),

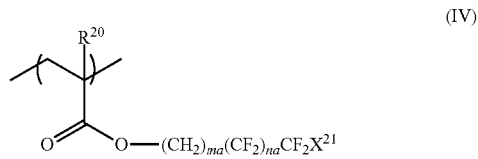

in formula (IV), $R^{20}$ represents a hydrogen atom or an alkyl group having 1 to 20 carbon atoms; ma and na each independently represent an integer of 0 to 19; where ma and na represent an integer of 0 to 19 in total; and $X^{21}$ represents a hydrogen atom or a fluorine atom.

7. The polymer compound according to claim 6,
wherein a content of the repeating unit represented by formula (I) is 10% to 50% by mass with respect to all repeating units, a content of the repeating unit represented by formula (II) is 5% to 50% by mass with respect to all repeating units, and a content of the repeating unit represented by formula (III) is 10% to 60% by mass with respect to all repeating units.

8. The polymer compound according to claim 5,
wherein a content of the repeating unit represented by formula (I) is 10% to 50% by mass with respect to all repeating units, a content of the repeating unit represented by formula (II) is 5% to 50% by mass with respect to all repeating units, and a content of the repeating unit represented by formula (III) is 10% to 60% by mass with respect to all repeating units.

9. The polymer compound according to claim 1,
wherein a content of the repeating unit represented by formula (I) is 10% to 50% by mass with respect to all repeating units, a content of the repeating unit represented by formula (II) is 5% to 50% by mass with respect to all repeating units, and a content of the repeating unit represented by formula (III) is 10% to 60% by mass with respect to all repeating units.

10. A composition comprising:
a polymer compound having a repeating unit represented by formula (I) and a repeating unit represented by formula (II),

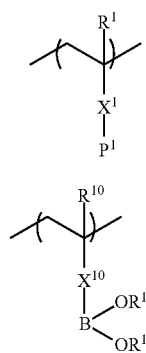

(I)

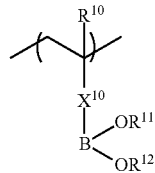

(II)

in formula (I), $R^1$ represents a hydrogen atom or an alkyl group having 1 to 20 carbon atoms; $X^1$ represents a single bond or a divalent linking group selected from the group consisting of —O—, —S—, —COO—, —OCO—, —CONR$^2$—, —NR$^2$COO—, —CR$^2$N—, a substituted or unsubstituted divalent aliphatic group, a substituted or unsubstituted divalent aromatic group, and a combination thereof; $R^2$ represents a hydrogen atom, an alkyl group having 1 to 20 carbon atoms, or —$X^1$—$P^1$; and $P^1$ represents a polymerizable group,
in formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other through an alkylene linking group, an arylene linking group, or a linking group of a combination thereof; $X^{10}$ represents a single bond or a divalent linking group selected from the group consisting of —O—, —S—, —COO—, —OCO—, —CONR$^{13}$—, —NR$^{13}$COO—, —CR$^{13}$N—, a substituted or unsubstituted divalent aliphatic group, a substituted or unsubstituted divalent aromatic group, and a combination thereof; and $R^{13}$ represents a hydrogen atom or an alkyl group having 1 to 20 carbon atoms,
wherein the polymerizable group represented by $P^1$ in formula (I) is any polymerizable group selected from the group consisting of groups represented by formulae (P-1) to (P-7),

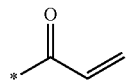
(P-1)

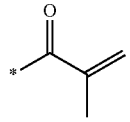
(P-2)

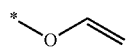
(P-3)

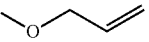
(P-4)

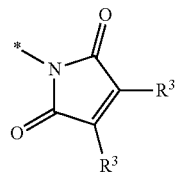
(P-5)

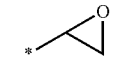
(P-6)

(P-7)

in formulae (P-1) to (P-7), * represents a bonding position with $X^1$; $R^3$ represents a hydrogen atom or an alkyl group having 1 to 5 carbon atoms; and two $R^3$'s may be the same or different from each other and may be linked to each other to form a ring structure, and
wherein a content of the polymer compound is 0.0001% to 40% by mass with respect to 100% by mass of a total solid content of the composition.

11. The composition according to claim 10,
wherein a content of the polymer compound is 0.001% to 20% by mass with respect to 100% by mass of a total solid content of the composition.

12. The composition according to claim 10,
wherein a content of the polymer compound is 0.1% to 5% by mass with respect to 100% by mass of a total solid content of the composition.

13. The composition according to claim 10,
wherein $R^1$ in formula (I) is a hydrogen atom or a methyl group, and $X^1$ in formula (I) is a divalent linking group selected from the group consisting of —O—, —COO—, —OCO—, a substituted or unsubstituted divalent aliphatic group, and a combination thereof.

14. The composition according to claim 10,
wherein a content of the repeating unit represented by formula (I) is 5% to 80% by mass with respect to all repeating units, and a content of the repeating unit represented by formula (II) is 3% to 80% by mass with respect to all repeating units.

* * * * *